US012612738B2

(12) United States Patent
Ziegenbein

(10) Patent No.: US 12,612,738 B2
(45) Date of Patent: *Apr. 28, 2026

(54) ABSORBENT PAPER PRODUCTS HAVING UNIQUE PHYSICAL STRENGTH PROPERTIES

(71) Applicant: MERCER INTERNATIONAL INC, Vancouver (CA)

(72) Inventor: Tobias Ziegenbein, Vancouver (CA)

(73) Assignee: MERCER International Inc., Vancouver (CA)

(*) Notice: Subject to any disclaimer, the term of this patent is extended or adjusted under 35 U.S.C. 154(b) by 408 days.

This patent is subject to a terminal disclaimer.

(21) Appl. No.: 18/333,353

(22) Filed: Jun. 12, 2023

(65) Prior Publication Data

US 2023/0383471 A1 Nov. 30, 2023

Related U.S. Application Data

(63) Continuation-in-part of application No. 16/865,950, filed on May 4, 2020, now Pat. No. 11,674,267, (Continued)

(51) Int. Cl.
*D21H 27/30* (2006.01)
*B32B 29/00* (2006.01)
(Continued)

(52) U.S. Cl.
CPC .......... *D21H 27/30* (2013.01); *B32B 29/005* (2013.01); *D21F 11/14* (2013.01); *D21H 11/02* (2013.01);
(Continued)

(58) Field of Classification Search
None
See application file for complete search history.

(56) References Cited

U.S. PATENT DOCUMENTS 3,058,873 A 10/1962 Keim
3,301,746 A 1/1967 Sanford et al.
(Continued)

FOREIGN PATENT DOCUMENTS

WO 2004057109 A1 12/2003
WO 2011154855 5/2011
(Continued)

OTHER PUBLICATIONS

Smook, Gary A., Handbook for Pulp and Paper Technologists, 2nd ed, Angus Wilde Publications, 1992, pp. 264-265. (Year: 1992).*
(Continued)

*Primary Examiner* — Dennis R Cordray
(74) *Attorney, Agent, or Firm* — NEXUS IP LAW PLLC

(57) ABSTRACT

A differential density absorbent towel paper product comprising at least one absorbent towel paper web is disclosed. The absorbent towel paper web has: (a) from about 20% to about 90% by weight of the dry fiber basis of the absorbent towel paper web of a refined soft wood pulp fiber mixture, (b) pulp fibers selected from the group consisting of hard wood fibers, non-wood fibers, recycled fibers, synthetic polymer fibers, bleached eucalyptus kraft fibers, and combinations thereof and, (c) not more than about 10% by weight moisture. The refined soft wood pulp fiber mixture has: i) from about 18.5% to about 88.5% by weight of soft wood pulp fiber; ii) from about 0.25% to about 5.0% by of cationic strengthening polymer; and, iii) from about 0.05% to about 20% by weight of cellulose nano-filaments.

9 Claims, 3 Drawing Sheets

Related U.S. Application Data which is a continuation of application No. 15/708,491, filed on Sep. 19, 2017, now Pat. No. 10,640,928.

(60) Provisional application No. 62/396,812, filed on Sep. 19, 2016.

(51) Int. Cl.

| | |
|---|---|
| ***D21F 11/14*** | (2006.01) |
| ***D21H 11/02*** | (2006.01) |
| ***D21H 11/08*** | (2006.01) |
| ***D21H 11/18*** | (2006.01) |
| ***D21H 15/02*** | (2006.01) |
| ***D21H 17/44*** | (2006.01) |
| ***D21H 21/20*** | (2006.01) |
| ***D21H 27/00*** | (2006.01) |

(52) U.S. Cl.

CPC ............. *D21H 11/08* (2013.01); *D21H 11/18* (2013.01); *D21H 15/02* (2013.01); *D21H 17/44* (2013.01); *D21H 21/20* (2013.01); *D21H 27/002* (2013.01); *D21H 27/005* (2013.01); *B32B 2250/02* (2013.01); *B32B 2307/54* (2013.01); *B32B 2317/12* (2013.01); *B32B 2554/00* (2013.01)

(56) References Cited

U.S. PATENT DOCUMENTS

| | | | |
|---|---|---|---|
| 3,880,368 | A | 4/1975 | Matthew |
| 3,974,025 | A | 8/1976 | Ayers |
| 3,994,771 | A | 11/1976 | Morgan, Jr. et al. |
| 4,191,609 | A | 3/1980 | Trokhan |
| 4,300,981 | A | 11/1981 | Carstens |
| 4,374,702 | A | 2/1983 | Turbak et al. |
| 4,445,974 | A | 5/1984 | Stenberg |
| 4,447,294 | A | 5/1984 | Osborn, III |
| 4,529,480 | A | 7/1985 | Trokhan |
| 4,637,859 | A | 1/1987 | Trokhan |
| 4,735,849 | A | 4/1988 | Murakami et al. |
| 5,048,589 | A | 9/1991 | Cook et al. |
| 5,087,324 | A | 2/1992 | Awofeso et al. |
| 5,129,988 | A | 7/1992 | Farrington, Jr. |
| 5,399,412 | A | 3/1995 | Sudall et al. |
| 5,494,554 | A | 2/1996 | Edwards et al. |
| 5,582,685 | A | 12/1996 | Vinson |
| 5,607,551 | A | 3/1997 | Farrington, Jr. et al. |
| 5,656,132 | A | 8/1997 | Farrington, Jr. et al. |
| 5,759,926 | A | 6/1998 | Pike et al. |
| 5,840,403 | A | 11/1998 | Trokhan et al. |
| 5,895,710 | A | 4/1999 | Sasse et al. |
| 6,017,417 | A | 1/2000 | Wendt et al. |
| 6,017,418 | A | 1/2000 | Onaran et al. |
| 6,054,218 | A | 4/2000 | Nucci et al. |
| 6,303,000 | B1 | 10/2001 | Floyd et al. |
| 6,379,494 | B1 | 4/2002 | Jewell et al. |
| 6,398,906 | B1 | 6/2002 | Kobayashi et al. |
| 6,398,916 | B1 | 6/2002 | Klerelid |
| 6,423,183 | B1 | 7/2002 | Goulet et al. |
| 6,432,267 | B1 | 8/2002 | Watson |
| 6,602,994 | B1 | 8/2003 | Cash et al. |
| 7,314,665 | B2 | 1/2008 | Stelljes, Jr. et al. |
| 7,718,036 | B2 | 5/2010 | Sumnicht et al. |
| 7,744,726 | B2 | 6/2010 | Scherb et al. |
| 7,811,418 | B2 | 10/2010 | Klerelid et al. |
| 7,931,781 | B2 | 4/2011 | Scherb et al. |
| 7,988,829 | B2 | 8/2011 | Klerelid et al. |
| 8,066,849 | B2 | 11/2011 | Kokko et al. |
| 8,236,140 | B2 | 8/2012 | Scherb et al. |
| 8,268,130 | B2 | 9/2012 | Sinkko et al. |
| 8,298,374 | B2 | 10/2012 | Shannon et al. |
| 8,377,563 | B2 | 2/2013 | Miyawaki et al. |
| 8,388,803 | B2 | 3/2013 | Super et al. |
| 8,444,808 | B2 | 5/2013 | Koslow et al. |
| 8,608,906 | B2 | 12/2013 | Laleg et al. |
| 8,608,909 | B2 | 12/2013 | Scherb et al. |
| 8,658,287 | B2 | 2/2014 | Berglund et al. |
| 8,778,505 | B2 | 7/2014 | Shannon |
| 8,821,690 | B2 | 9/2014 | Oksanen et al. |
| 8,834,677 | B2 | 9/2014 | Tirimacco et al. |
| 8,871,922 | B2 | 10/2014 | Hu et al. |
| 8,906,198 | B2 | 12/2014 | Sabourin et al. |
| 8,992,728 | B2 | 3/2015 | Isogal et al. |
| 9,017,517 | B2 | 4/2015 | Super et al. |
| 9,187,865 | B2 | 11/2015 | Nelson et al. |
| 9,206,551 | B2 | 12/2015 | Esser |
| 9,340,914 | B2 | 5/2016 | Manifold et al. |
| 9,375,116 | B2 | 6/2016 | Graff |
| 9,422,641 | B2 | 8/2016 | Jakson et al. |
| 9,441,326 | B2 | 9/2016 | Kawka |
| 9,493,911 | B2 | 11/2016 | Miller et al. |
| 9,506,198 | B2 | 11/2016 | Laine et al. |
| 9,663,901 | B2 | 5/2017 | Heiskanen et al. |
| 9,702,085 | B2 | 7/2017 | Kosonen et al. |
| 9,739,015 | B2 | 8/2017 | Miller et al. |
| 9,777,129 | B2 | 10/2017 | Sumnicht et al. |
| 9,879,361 | B2 | 1/2018 | Pande et al. |
| 2002/0074100 | A1 | 6/2002 | Yeh |
| 2002/0168912 | A1 | 11/2002 | Bond et al. |
| 2003/0203695 | A1 | 10/2003 | Polanco et al. |
| 2004/0101704 | A1 | 5/2004 | Hermans et al. |
| 2004/0118540 | A1 | 6/2004 | Gamier et al. |
| 2005/0153100 | A1 | 7/2005 | Zoller et al. |
| 2007/0207293 | A1 | 9/2007 | Santiago |
| 2008/0057307 | A1 | 3/2008 | Koslow et al. |
| 2009/0020248 | A1 | 1/2009 | Sumnicht et al. |
| 2009/0054858 | A1 | 2/2009 | Cheng et al. |
| 2010/0065236 | A1 | 3/2010 | Henriksson et al. |
| 2010/0147473 | A1 | 6/2010 | Ward et al. |
| 2010/0186922 | A1 | 7/2010 | Quigley |
| 2011/0265965 | A1 | 11/2011 | Sumnicht et al. |
| 2012/0012031 | A1 | 1/2012 | Husband et al. |
| 2012/0094953 | A1 | 4/2012 | Gane et al. |
| 2012/0132383 | A1 | 5/2012 | Laine et al. |
| 2012/0136146 | A1 | 5/2012 | Heiskanen et al. |
| 2012/0244320 | A1 | 9/2012 | Sauter et al. |
| 2012/0277351 | A1 | 11/2012 | Yano et al. |
| 2012/0285640 | A1 | 11/2012 | Westland et al. |
| 2013/0017394 | A1 | 1/2013 | Hua et al. |
| 2013/0319625 | A1 | 12/2013 | Mohammadi et al. |
| 2014/0124152 | A1 | 5/2014 | Polat et al. |
| 2015/0041091 | A1 | 2/2015 | Castro et al. |
| 2015/0125658 | A1 | 5/2015 | Bilodeau et al. |
| 2015/0275433 | A1 | 10/2015 | Dorris et al. |
| 2015/0368368 | A1 | 12/2015 | Retsina et al. |
| 2016/0090692 | A1 | 3/2016 | Eagles et al. |
| 2016/0138224 | A1 | 5/2016 | Shannon et al. |
| 2016/0160448 | A1 | 6/2016 | Miller, IV et al. |
| 2016/0215179 | A1 | 7/2016 | Sumnicht et al. |
| 2016/0289453 | A1 | 10/2016 | Cai et al. |
| 2016/0319482 | A1 | 11/2016 | Ben et al. |
| 2016/0362843 | A1 | 12/2016 | Hermans et al. |
| 2017/0175332 | A1 | 6/2017 | Mohammad et al. |

FOREIGN PATENT DOCUMENTS

| | | |
|---|---|---|
| WO | 2011064441 | 6/2011 |
| WO | 2012097446 | 7/2012 |
| WO | 2013160553 | 10/2013 |
| WO | 2014029917 | 2/2014 |
| WO | 2015044520 | 4/2015 |
| WO | 2016134256 A1 | 2/2016 |
| WO | 2016176759 | 11/2016 |
| WO | 2017008171 | 1/2017 |

OTHER PUBLICATIONS

Ulrich Hirn & Robert Schennach, Comprehensive analysis of individidual Pulp fiber bonds quantifies the mechanisms of fiber bonding in paper, Nature Magazine/Scientific Reports, May 22, 2015.

Jack Miller, NANOC E LLU LOS Estate of the Industry, Dec. 2015.

(56) References Cited

OTHER PUBLICATIONS

Rauni Seppanen, Use of nanocellulose for high performance papermaking products, Sep. 30, 2014.
Robert J. Moon, Ashlie Martini, John Nairn, John Simonsen, Jeffrey Youngblood, Cellulose rianomaterials review: structure, properties and nanocomposites, Chem Soc Rev, 2011,40, 3941-3994.
EC 1-IDMONOFF, Re. Evans, C.D. Weaver, Nanolibrillated Cellulose Fibers: Where Size Matters in Opening New Markets to Nanoliber Usage, Presentation to 2008 TAPPI Nanotechnology Conference, Jun. 25-27, 2008.
Mark Williamson, Canadian mills test drive cellulose filaments, Paper Advance, Jun. 8, 2015.
Suzanne Pinkney, David Skuse, Neil Rowson, Stuart Blackburn, Microfibrillated cellulose—a new structural material No Date.
Tero Taipale, Interactions of Microfibrillated Cellulose and Cellulosic Fines with Cationic Polyelectrolytes, Doctoral Dissertation, TKK Reports in Forest Products Technology, Series AI2, Oct. 22, 2010.
Mikael Ankerfors, Microfibrillated cellulose: Energy-efficient preparation techniques and applications in paper, Doctoral Thesis, KTH Royal Institute of Technology, Stockholm, Sweden, 2015.
Hiernan Charreau, Maria L. Foresti, and Analia Vazquez, Nanocellulose Patents Trends: A comprehensive Review on Patents on Cellulose Nanocrystals, Microfibrillated and Bacterial Cellulose, Recent Patents on Nanotechnology, 2012, 7, 56-80.
Gary Chinga-Carrasco, Cellulose fibres, nanofibrils and microfibrils: The morphological sequence of MFC components from a plant physiology and fibre technology point of view, Nanoscale Research Letters 20116:417, Jun. 13, 2011.
Solenis International LP, Hercobond (TM) 1194 dry strength resin, Product Data solenis.com, DSR-PDS-NA-Hiercobond 1194-R2 No Date.
Valmet, Valmet's Advantage (TM) NTT (R) Concept, Valrnet Technical Paper Series, Dec. 3, 2009.
Balazs Tolnai, FiloCell (TM)—Commercialization of Cellulose Filament, PACWEST Conference, Jun. 11, 2015.
Xujun Hua, Maki-Ilouf Laleg and Thomas Owston, Cellulose Filaments: Discovery by FPInnovations of a 11ovel Strengthening Agent, Pacwest Conference, Jun. 11, 2015.
Israel Gonzalez, Sami Boufi, Maria Angels Pelach, Manelalcala Fabiola Vilaseca, and Pere I1UTJE, Nanolibrillated Cellulose as Paper Additive in Eucalyptus Pulp, BioResources.com, 5167-5180, 2012.

* cited by examiner

ABSORBENT PAPER PRODUCTS HAVING UNIQUE PHYSICAL STRENGTH PROPERTIES

CROSS REFERENCE TO RELATED APPLICATION

The present application is a continuation-in-part of application Ser. No. 16/865,950, filed May 4, 2020, which is a continuation of application Ser. No. 15/708,491, filed on Sep. 19, 2017, now U.S. Pat. No. 10,640,928, and claims the benefit of U.S. provisional patent application Ser. No. 62/396,812 filed on Sep. 19, 2016, each of which is hereby incorporated herein by reference in its entirety.

FIELD OF THE DISCLOSURE

The present invention relates to paper products. More specifically, the present invention relates to absorbent paper products having unique physical strength properties. Even more specifically, the present invention relates to absorbent paper products having a high Mean Square Dry Tensile Strength Index and a high ratio of Cross-directional Wet Tensile Strength to Cross-directional Dry Tensile Strength.

BACKGROUND OF THE DISCLOSURE

Tissue products such as facial tissues, paper towels, bath tissues, napkins and other similar products, are designed to include several important properties. For example, products should have good bulk, good absorbency, a soft feel, and should have good strength and durability. Unfortunately, when steps are taken to increase one property of the product, the other characteristics of the product are often adversely affected.

Formulators have for years attempted to balance the level of softwood fibers in their paper structures to ensure adequate strength of their structures while at the same time trying to minimize the negative impacts from higher levels of softwood fibers.

One example of the problem is demonstrated by the efforts that formulators of paper toweling products have been putting forth, working to develop new products that have higher in-use wet strength while maintaining or reducing dry strength. However, as formulators use typical paper-making machine process variables to increase product in-use wet strength, other consumer desired attributes, such as absorbency and/or softness typically decrease. The problem formulators struggle with for improving paper toweling is, how to increase towel in use wet strength while maintaining or improving softness and/or absorbency and/or decrease softwood inclusion while maintaining or reducing total product dry strength and increasing sheet flexibility. All of the normal paper-making machine process variables available to a papermaker for increasing strength normally can negatively affect the sheet feel and can negatively impact product absorbency.

Accordingly, there continues to be a need for new fibrous paper structures that further optimize the physical product performance of towel products that increase wet strength without sacrificing softness, absorbency and paper making reliability. Specifically, there is a need for new fibrous paper structures that increase wet strength while maintaining or reducing dry strength. Such structures are especially valuable for multi-density paper making structures with non-limiting examples of such structures being manufactured on Through-Air Dried, Fabric Crepe. NTT, ATMOS and UCTAD machine processes.

SUMMARY OF THE DISCLOSURE

The present disclosure provides a differential density absorbent towel paper comprising at least one absorbent towel paper web. The absorbent towel paper web comprises: (a) from about 20% to about 90% by weight of the dry fiber basis of the absorbent towel paper web of a refined soft wood pulp fiber mixture, (b) pulp fibers selected from the group consisting of hard wood fibers, non-wood fibers, recycled fibers, synthetic polymer fibers, bleached eucalyptus kraft fibers, and combinations thereof and, (c) not more than about 10% by weight moisture. The refined soft wood pulp fiber mixture comprises: i) from about 18.5% to about 88.5% by weight of the dry fiber basis of the absorbent towel paper web of soft wood pulp fiber; ii) from about 0.25% to about 5.0% by weight of the dry fiber basis of the absorbent towel paper web of cationic strengthening polymer; and, iii) from about 0.05% to about 20% by weight of the dry fiber basis of the absorbent towel paper web of cellulose nano-filaments. The soft wood pulp fiber is refined at a delivered energy of less than about 50.3 kWH/bdt before being added to the mixture. The absorbent towel paper web has a Total Tensile Strength index ranging from about 6 N·m/g to about 12 N·m/g and has a Cross-directional Wet Tensile Strength to Cross-directional Dry Tensile Strength Ratio value ranging from about 0.295 to about 0.33. Additionally, the soft sanitary tissue paper web may have a Mean Square Dry Tensile Strength Index ranging from 5 N·m/g to about 10 N·m/g.

The present disclosure also provides a differential density soft sanitary tissue paper product comprising at least one soft sanitary tissue paper web. The soft sanitary tissue paper web comprises: (a) from about 20% to about 90% by weight of the dry fiber basis of the soft sanitary tissue paper web of a refined soft wood pulp fiber mixture, (b) pulp fibers selected from the group consisting of hard wood fibers, non-wood fibers, recycled fibers, synthetic polymer fibers, bleached eucalyptus kraft fibers, and combinations thereof and, (c) not more than about 10% by weight moisture. The refined soft wood pulp fiber mixture has: i) from about 18.5% to about 88.5% by weight of the dry fiber basis of the soft sanitary tissue paper web of soft wood pulp fiber, ii) from about 0.25% to about 5.0% by weight of the dry fiber basis of the soft sanitary tissue paper web of cationic strengthening polymer and, iii) from about 0.05% to about 20% by weight of the dry fiber basis of the soft sanitary tissue paper web of cellulose nano-filaments. The soft wood pulp fiber is refined at a delivered energy of less than about 50.3 kWH/bdt before being added to the mixture. The soft sanitary tissue paper product has a Total Tensile Strength Index ranging from about 8 N·m/g to about 20 N·m/g. Additionally, the soft sanitary tissue paper product may have a Mean Square Dry Tensile Strength Index ranging from 4 N·m/g to about 10 N·m/g.

These and other objects, advantages, purposes and features of the present invention will become apparent upon review of the following specification in conjunction with the drawings.

DETAILED DESCRIPTION OF PREFERRED EMBODIMENTS

Figure 1:
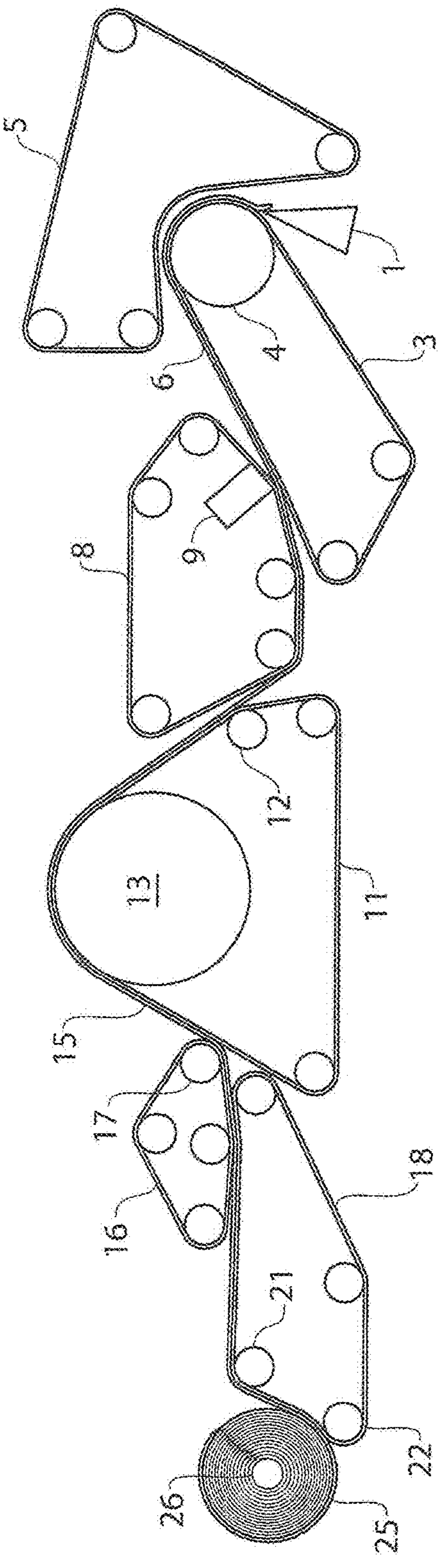
FIG. 1. is a schematic diagram of one embodiment of a process for making a multi-density absorbent paper towel via a Through-Air Dried paper-making machine for use in the present disclosure.

The present disclosure relates to absorbent towel paper products having a high wet tensile strength to dry tensile strength ratio while maintaining dry tensile despite having lower refining energy input to the softwood stream and while maintaining cationic resin addition constant. The absorbent towel paper products comprise two plies of absorbent towel paper webs.

Each of the paper towel webs comprise from about 20% to about 90% by weight of the dry fiber basis of the towel paper web of a refined soft wood pulp fiber mixture. The refined soft wood pulp fiber mixture comprises from about 18.5% to about 88.5% by weight of the dry fiber basis of the towel paper web of soft wood pulp fiber. The soft wood pulp fiber is optionally refined before being added to the mixture. The soft wood pulp fiber mixture also comprises from about 0.25% to about 5.0% by weight of the dry fiber basis of the towel paper web of a cationic strengthening polymer. The paper towel webs also comprise from about 10% to about 55% by weight of the dry fiber basis of the towel paper web of a hard wood pulp fiber mixture. The paper towel webs comprise not more than about 10% by weight moisture.

The two-ply paper towel product maintains dry strength as measured by having a Total Tensile Strength Index ranging from about 8 N·m/g to about 20·N·m/g or as measured by Dry Tensile Strength ranging from about 500 N/m to about 1000 N/m. Additionally, the soft sanitary tissue paper product may have a Mean Square Dry Tensile Strength Index ranging from 4 N·m/g to about 10 N·m/g. The paper towel webs have improved wet strength in relation to the web's dry strength as measured by having a Cross-directional Wet Tensile Strength to Cross-directional Dry Tensile Strength Ratio value ranging from about 0.20 to about 0.50, preferably from about 0.295 to about 0.35. The paper towel webs maintain dry strength as measured by having a Total Tensile Strength Index ranging from about 6 N·m/g to about 12·N·m/g or as measured by Dry Tensile Strength ranging from about 300 N/m to about 600 N/m. In addition the paper towel webs may have a Mean Square Dry Tensile Strength Index ranging from 5 N·m/g to about 10 N·m/g.

As used herein, "Paper Product" refers to any formed, fibrous structure products, traditionally, but not necessarily, comprising cellulose fibers. In one embodiment, the paper products of the present disclosure include absorbent towel products ("Paper Towel Product"). In an alternative embodiment, the paper products of the present disclosure may include soft sanitary tissue products.

"Absorbent towel product" as used herein is a class of paper product that is designed and manufactured to meet the consumer need for liquid absorption and wet scrubbing along with soft hand feel. Absorbent towel paper webs are made on the same paper making technology as webs of sanitary tissue and facial tissue, but raw materials, paper making process setup, basis weight and other raw materials are optimized to deliver the desired consumer attributes.

The paper product of the present disclosure refers to paper products comprising paper tissue products or paper towel products. The disclosed paper technology in general, includes but is not limited to, conventional felt pressed or conventional wet-pressed tissue papers, pattern densified tissue papers, wet creped tissue paper products, Through-Air Dried tissue paper products whether creped or uncreped. For example, a paper making process of the present disclosure can utilize adhesive creping, wet creping, double creping, embossing, wet-pressing, air pressing, through-air drying, creped through-air drying, uncreped through-air drying, as well as other steps in forming the paper web. Some examples of such techniques are disclosed in U.S. Pat. Nos. 4,529,480, 5,048,589, 5,399,412, 5,129,988, 5,494,554, 5,607,551, 6,398,916, 7,744,726, and 8,388,803.

When forming multi-ply towel products such as the products of the present disclosure, the separate plies can be made from the same process or from different processes as desired. For example, in one embodiment, towel webs may be creped through-air dried webs formed using processes known the art.

To form such webs, an endless traveling forming fabric, suitably supported and driven by rolls, receives the layered or non-layered paper making stock issuing from the headbox. A vacuum box is disposed beneath the forming fabric and is adapted to remove water from the fiber furnish to assist in forming a web. From the forming wire/fabric, a formed web is transferred to a second fabric by a vacuum assist or mechanical means, and this second template may be either a wire, a felt, or a woven fabric as long as the desired topography is created in the structure of the template. The use of a sheet forming template that creates a paper making structure with a plurality of fiber enriched regions of high local basis weight interconnected with a plurality of lower local basis weight regions. The fabric is supported for movement around a continuous path by a plurality of guide rolls. A pick-up roll designed to facilitate transfer of web from fabric to fabric may be included to transfer the web.

The formed web is then dried to a moisture level less than about 10% by weight moisture, or less than about 6%, or less than about 4% by weight moisture. Preferably the formed web is dried blowing heated air through the formed web and then by transfer to the surface of a rotatable heated dryer drum, such as a Yankee dryer. The drying cylinder is optionally provided with a resinous protective coating layer underneath the resinous adhesive coating composition. The resinous adhesive coating composition is preferably rewettable. The process is operated such that the adhesive coating is maintained to provide sufficient wet tack strength upon the transfer of the web to the drying cycling to secure the web during drying. The adhesive resin coating composition is also maintained such that the adhesive coating compositions pliant when dried such that the web may be removed from the drying cylinder without significant sheet damage when drying is accomplished. The web may be transferred to the Yankee directly from the through drying fabric, if the drying fabric has topography, or preferably, transferred to an impression fabric which is then used to transfer the web to the Yankee dryer. The web is then removed from the dryer drum by a creping blade. The creping of the web further reduces internal bonding within the web and increases softness and absorbency.

In other embodiments, the base web is formed by an uncreped through-air dried process. Related uncreped through-air dried tissue processes are described for example, in U.S. Pat. Nos. 5,656,132 and 6,017,417.

The fibrous structures in accordance with the present disclosure may be in the form of through-air-dried fibrous structures, differential density fibrous structures, differential basis weight fibrous structures, wet laid fibrous structures, air laid fibrous structures, creped or uncreped fibrous structures, pattern-densified or non-pattern-densified fibrous structures, compacted or un-compacted fibrous structures, double re-creped fibrous structures as well known in the art as exemplified in U.S. Pat. Nos. 3,301,746, 3,974,025, 4,191,609, 4,637,859, 6,398,906, and 8,388,803.

The absorbent towel paper web of the present disclosure has a Machine Direction and a Cross-Machine Direction orthogonal to the Machine Directions. "Machine Direction" (MD) and "Cross Machine Direction" (CD) as used herein are defined as follows. The "Machine Direction" of the paper web is the direction within the plane of the paper web that is parallel with the length of the paper making machine. The "Cross Machine Direction" of the paper web is the direction within the plane of the paper web that is perpendicular to the length of the paper making machine and therefore orthogonal to the Machine Direction. Total dry tensile is the sum of the machine direction and cross machine direction tensile.

As use herein, the phrase "papermaking furnish" refers to aqueous mixture of either cellulosic or non-cellulosic fibers, paper making functional aids (strength, absorbency or softness improvement), fillers and other paper making process materials that are used to form the papermaking web. The cellulosic fibers envisioned are standard "market" available materials sold as soft wood pulp fibers, such as Bleached Soft Wood Kraft, hard wood pulp fiber, such as Bleached Hardwood Kraft, non-wood fiber, recycled fiber, synthetic polymer fibers and or bleached eucalyptus kraft pulp, and do not include fibrous materials that have been modified to enhance surface bonding characteristics such as enhanced carboxylated fibers that is taught in U.S. Pat. No. 6,379,494 or similar methods of fiber modification.

The absorbent towel paper webs of the present disclosure comprise from about 20% to about 90%, or from about 30% to about 80%, or from about 40% to about 70%, or from about 50% to about 60% of a refined soft wood pulp fiber mixture comprising soft wood pulp fiber and cationic strengthening polymer.

As used herein the phrase "percent (%) by weight of the dry fiber basis" refers to the percentage of referenced ingredient, including any carrier and/or delivery vehicle versus the dry final fiber web once all water and other volatile materials are removed from the papermaking web.

"Fiber", as used herein, means an elongate physical structure having an apparent length greatly exceeding it apparent diameter, i.e., a length to diameter ratio of at least about 10 and less than 200. Fibers having a non-circular cross-section and/or tubular shape are common; the "diameter" in this case may be considered to be the diameter of a circle having cross-sectional area equal to the cross-sectional area of the fiber. More specifically, as used herein, "fiber" refers to fibrous structure-making fibers. The present disclosure contemplates the use of a variety of fibrous structure-making fibers, such as, for example, natural fibers, such as cellulose nanofilaments and/or wood pulp fibers, non-wood fibers or any suitable fibers and any combination thereof.

Natural fibrous structure-making fibers useful in the present disclosure include animal fibers, mineral fibers, plant fibers, man-made spun fibers, and engineered fibrous elements such as cellulose nanofilaments. Animal fibers may, for example be selected from the group consisting of wool, silk, and mixtures thereof. The plant fibers may, for example, be derived from a plant selected from the group consisting of wood, cotton, cotton linters, flax, sisal, abaca, hemp, Hesper aloe, jute, bamboo, bagasse, esparto grass, straw, jute, hemp, milkweed floss, kudzu, corn, sorghum, gourd, agave, trichomes, loofah and mixtures thereof.

Wood fibers; often referred to as wood pulps are liberated from their source by any one of a number of chemical pulping processes familiar to one experienced in the art, including kraft (sulfate), sulfite, polysulfide, soda pulping, etc. Further, the fibers can be liberated from their source using mechanical and semi-chemical processes including, for example, roundwood, thermomechanical pulp, chemo-mechanical pulp (CMP), chemi-thermomechanical pulp (CTMP), alkaline peroxide mechanical pulp (APMP), neutral semi-chemical sulfite pulp (NSCS), are also contemplated. The pulp can be whitened, if desired, by any one or combination of processes familiar to one experienced in the art including the use of chlorine dioxide, oxygen, alkaline peroxide, and so forth. Chemical pulps, however, may be preferred since they impart superior tactile feel and/or desired tissue sheet properties. Pulps derived from both deciduous trees (hereinafter, referred to "hardwood") and coniferous trees (hereinafter, also referred to as "softwood") may be utilized and/or fibers derived from non-woody plants along with man-made fibers. The hardwood, softwood, and/or non-wood fibers can be blended, or alternatively, can be deposited in layers to provide a stratified and/or layered web. U.S. Pat. Nos. 4,300,981 and 3,994,771 disclose layering of softwood and hardwood fibers. Also applicable to the present disclosure are fibers derived from recycled paper, as well as other non-fibrous materials, such as adhesives used to facilitate the original papermaking and paper converting. The wood pulp fibers may be short (typical of hardwood fibers) or long (typical of softwood fibers and some non-wood fibers).

Examples of softwood fibers that can be used in the paper towel webs of the present disclosure include but are not limited to fibers derived from pine, spruce, fir, tamarack, hemlock, cypress, and cedar. Softwood fibers derived from the kraft process and originating from more-northern climates may be preferred. These are often referred to as northern bleached softwood kraft (NBSK) pulps.

The soft wood pulp fiber mixture of the absorbent towel paper web of the present disclosure comprises from about 18.5% to about 88.5%, or from about 25% to about 75%, or from about 35% to about 65%, or from about 45% to about 55% by weight of the dry fiber basis of towel paper web of soft wood pulp fiber.

The soft wood pulp fiber may optionally be treated to enhance bonding before addition to the soft wood pulp fiber mixture. This preparation of fibers my include mechanical refining treatment whereby the fibers are either compressed and/or subjected to high shear to make the fibers more flexible and create increased fiber to fiber bonding area through fiber fibrillation, fiber swelling and increased fiber flexibility. Refining may be performed by any means known by those skilled in the arts of papermaking. It has been unexpectedly learned that mechanical refining could be less than about 20 kilowatt-hours per bone dry ton (kWh/bdt), preferably less than about 10 kWh/bdt, and more preferably the fiber is not refined while still delivering enhanced wet strength while maintaining constant chemical addition and maintaining paper web dry strength.

The optional treatment to enhance fiber bonding may be achieved by chemical treatment or "chemical refining" also known in the pulp and papermaking arts to increase fiber to fiber bonding area through fiber fibrillation, fiber swelling thereby also increasing fiber flexibility.

Non-limiting examples of short hardwood fibers include fibers derived from a fiber source selected from the group consisting of acacia, eucalyptus, maple, oak, aspen, birch, cottonwood, alder, ash, cherry, elm, hickory, poplar, gum, walnut, locust, sycamore, beech, catalpa, sassafras, gamelan, albizzia, and magnolia.

The absorbent towel paper web comprises from about 10% to about 55%, or from about 20% to about 45%, or from about 30% to about 40% of a hard wood pulp fiber mix, comprising hard wood pulp.

Different embodiments of the absorbent towel paper webs of the present disclosure may also comprise additional pulp fibers as long as their respective surface is not modified.

Recycle fiber may be added to the furnish in any amount. While any suitable recycle fiber may be used, recycle fiber with relatively low levels of groundwood is preferred in many cases, for example, recycle fiber with less than 15% by weight lignin content, or less than 10% by weight lignin content may be preferred depending on the furnish mixture employed and the application.

"Synthetic polymer fiber" and like terminology refer to fiber made from synthetic polymers such as polyesters, nylons and polyolefins and so forth. Polyesters are generally obtained by known polymerization techniques from aliphatic or aromatic dicarboxylic acids with saturated aliphatic or aromatic diols. Preferred aromatic diacid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified and poly-condensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of naphthalene diol (1,5-; 2,6-; and 2,7-). Various mixtures of aliphatic and aromatic dicarboxylic acids and saturated aliphatic and aromatic diols may also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Examples of polyesters include; polyethylene terephthalate; poly(1,4-butylene)terephthalate; and 1,4-cyclohexylene dimethylene terephthalate/isophthalate copolymer and other linear homopolymer esters derived from aromatic dicarboxylic acids, including isophthalic acid, bibenzoic acid, naphthalene-dicarboxylic acid including the 1,5-; 2,6-; and 2,7-naphthalene-dicarboxylic acids; 4,4,-diphenylene-dicarboxylic acid; bis(p-carboxyphenyl)methane acid; ethylene-bis-p-benzoic acid; 1,4-tetramethylene bis(p-oxybenzoic) acid; ethylene bis(p-tetramethylene acid; 1,3-trimethylene bis(p-oxybenzoic) acid; and 1,4-tetramethylene bis(p-oxybenzoic) acid, and diols selected from the group consisting of 2,2-dimethyl-1,3-propane diol; cyclohexane dimethanol and aliphatic glycols of the general formula $HO(CH2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH2CH2O)_nH$ where n is an integer from 2 to 10,000, and aromatic diols such as hydroquinone, resorcinol and the isomers of naphthalene diol (1,5-; 2,6-; and 2,7). There can also be present one or more aliphatic dicarboxylic acids, such as adipic, sebacic, azelaic, dodecanedioic acid or 1,4-cyclohexanedicarboxylic acid.

Suitable polyolefin resins include material made by polymerizing such olefins as ethylene, propylene, butene-1, pentene-1,4-methylpent-1-ene, etc., in conventional manner. Useful polyolefins for fibers are high-density polyethylene (HDPE) and polypropylene. Other polyolefin homopolymers and copolymers of ethylene can be utilized in the practice of this disclosure. Such other polyolefins include low-density polyethylene (LDPE), very low-density polyethylene (VLDPE), linear low-density polyethylene (LLDPE) and polybutylene (PB). However, these other polyolefins can be blended with other polyolefins such as polypropylene or high-density polyethylene (HDPE).

Nylon or polyamide resins useful in the practice of the disclosure are well-known in the art and include semi-crystalline and amorphous resins, which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g., to form polyether polyamide block copolymers. Examples of polyamides include polyhexamethylene adipamide (nylon 66), polyhexamethylene azelamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine.

Synthetic polymer fibers are generally hydrophobic as compared with cellulose and lack anionic sites for bonding to wet strength resins or enough hydroxyl groups to hydrogen bond effectively to pulp-derived fiber. Suitable fibers used in connection with this disclosure include melt-spun fibers, melt-blown fibers, splittable fibers having multiple segments and especially segmented bicomponent fibers which are splittable into their segments by refining in a disk refiner. One suitable fiber available from Fiber Innovation Technology is a 16-segment, 2-denier nylon/polyester bicomponent fiber having a characteristic fineness of 0.125 denier, discussed below.

Segmented fiber preparation for making splittable fibers is generally known in connection with thermoplastic fibers, where fibers having segments formed of different polymers. See, for example, U.S. Pat. Nos. 5,759,926, 5,895,710, and United States Patent Application Publication No. 2003/0203695.

The splittable fibers produced and utilized in connection with this disclosure may have a segmented pie shape, an island in the sea configuration, a side-by-side configuration, a hollow configuration and so forth. See U.S. Pat. No. 4,735,849 (FIGS. 6A-6D) and United States Patent Application Publication No. US 2002/0168912 (FIGS. 2-9). Splittable fibers are suitably disintegrated prior to incorporation into the furnish as is discussed below.

Manmade fibers also contemplated for this disclosure are formed by using a cellulosic dope prepared via multiple solvents know by one skilled in the art. This dope is spun into fibers which can be used or further fibrillated and incorporated into the absorbent sheet. Not to be limited to theory, a synthetic cellulose such as Lyocell is considered along with modified Lyocell that has been reduced in size via refining and other methods to create smaller fibers and fiber segments. U.S. Pat. No. 7,718,036 shows various considered solvents and the inclusion of fibrillated losel in a tissue and towel structure.

During the preparation of fibers for a paper making operation, long fiber and some short fiber pulps are subjected to mechanical or chemical processing whereby the fibers are either compressed, subjected to high shear and/or chemically treated to make the fibers more flexible and create increased fiber to fiber bonding area through fiber fibrillation, fiber swelling and increased fiber flexibility. Those skilled in the art will recognize three predominate products of refining a pulp fiber are; 1) a percentage fibers are not impacted at all depending upon refining intensity and consistency, 2) a significant percentage of fibers are fibrillated whereby the fiber cell wall is delaminated and microfibrils are exposed that remain bound to the original fiber, and 3) a percentage of fibers and microfibrils are cut or mechanically broken into very small pieces (less than 200 microns in length) and this fraction is referred to as the fines fraction. These fines can either primary (those that exist in the native wood source) or secondary (those created during the act of refining). What has been discovered is that that by altering refining intensity, consistency and other processing conditions, a new fiber constituent can be created called cellulose nanofilaments and by optimizing the processing stages and unit operations a resultant pulp fiber stream containing greater 40% of individualized cellulose nanofilaments can be produced.

These "cellulose nanofilaments" may be used in embodiments of the present disclosure. They may be derived from either softwood and/or hardwood and as such may contain fibrous elements of the softwood or hardwood. The cellulose nanofilament size and high aspect ratio distinguish this material as a unique fiber class and not characterized as either a softwood or hardwood material. By high aspect ratio it is meant a fiber length divided by fiber width of at least 200 to about 5000, or greater than about 600 to about 1000. The cellulose nanofilament has an average width in the nanometer range, for example an average width of about 30 nm to about 500 nm, and an average length in the micrometer range or above, for example an average length above about 10 μm, or from about 100 μm to about 2 mm, or from about 200 μm to about 1 mm, or from about 300 μm to about 500 μm. Such cellulose nanofilaments can be obtained, for example, from a process which uses mechanical means only, for example, the methods disclosed in U.S. Patent Application Publication No. 2013/0017394. In addition, cellulose nanofilaments can be made from a variety of processes as long as the specified geometry is maintained. Processes used to create cellulose nano filaments include but are not limited to modified refining equipment, homogenizers, sonic fiber treatment, and chemical fiber treatment including enzymatic fiber modification.

In the paper "*Nanocellulose Patent Trends: A Comprehensive Review on Patents on Cellulose Nanocrystals, Microfibrillated and Bacterial Cellulose*", Charreau et al., Nanotechnology, 2013 7, 56-80, the author reviews the various terms to refer to mircofibrillated cellulose (MFC) over the years and "cellulose nanofilaments" could fit into these general terms. The "cellulose nanofilament" material of the present disclosure is specifically the result of the process disclosed in U.S. Patent Application Publication No. US20130017394 A1. The material produced by this process is unique in that the process disclosed produces cellulose nanofilaments with aspect ratios (length/width) significantly higher than previously disclosed materials.

The cellulose nanofilaments are structurally very different from other cellulose fibrils such as microfibrillated cellulose (MFC) or nanofibrillated cellulose (NFC) prepared using other methods for mechanical disintegration of wood pulp fibers in that they have at least 40%, or about 75%, or about 90% by weight of the filaments of the fibrillated cellulose material have a filament length up to 300-350 μm and diameters of approximately 100-500 nm. The fibrillated cellulose material in NFC typically has lengths shorter than 100 μm while the fibrillated cellulose material in NFC typically has lengths shorter than 1 μm. However, it should be recognized by those skilled in the art that in the production of cellulose nanofilaments material, like other fibrillated cellulose materials produced using mechanical means are not homogeneous material with one single dimension value. The cellulose nanofilament material described above and the preferred blend of a refined pulp stream containing >50% cellulose nanofilaments within a refined pulp stream are the basis for this disclosure.

Another envisioned application of cellulose nanofilaments possible in embodiments contemplated in this disclosure is the inclusion of a small percentage of either pure cellulose nanofilaments and/or a mixture of cellulose nanofilaments and other refining products to a virgin or recycled pulp stream before being shipped to a paper making site. In this way a virgin fiber source can be enhanced via cellulose nanofilament addition and then the cellulose nanofilaments can be added to a paper making process without introducing a new fiber dosing stream. By dosing cellulose with nanofilaments at a pulp production facility one could produce what could be termed a "super pulp" with characteristics only possible through cellulose nanofilament inclusion. Therefore, many different methods for cellulose monofilament addition are considered in the disclosure and these include but are not limited to direct pure cellulose nanofilament inclusion, including a mixture of cellulose nanofilaments and other refining byproducts with a preferred nanocellulose content of greater than 50% and cellulose nanofilaments being added via inclusion in virgin or recycled fiber before inclusion at the paper mill.

The phrase "Fibrillated cellulose fibers" as use herein, are cellulosic fibers that have undergone mechanical or chemical treatment during which individual or bundles of cellulosic filaments are liberated from the body of the fiber but remain joined to the fiber on one end creating more bonding area and increased fiber to fiber contact. The degree of treatment determines the number of cellulose nanofilaments that have been released from the fiber.

As used herein, the phrase "non-cellulosic fibers" means the group of paper making fibers that are composed of either natural or man-made fibers that are composed of materials other than cellulose. Non-cellulosic fibers include but are not limited to man-made spun fibers, fibers from animal sources, and/or micro-algae. Additionally, fibers forming the products of the present disclosure may be spun from polymer melt compositions via suitable spinning operations, such as melt blowing and/or spin bonding and/or they may be obtained from natural sources. Such fibers may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like. Non-limiting examples of filaments include melt blown and/or spun bond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyester amide filaments and polycaprolactone filaments. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers. Staple fibers may be produced by spinning a filament tow and then cutting the two into segments of less than 5.08 cm (2 in.) thus producing fibers.

As used herein, the phrase "cellulosic fines", means the class of fibers materials that have a length of less than 200 μm. These materials can include primary, or naturally occurring materials in a tree, or they can be classified as secondary, those created by either pulping and/or handling of pulp fibers and therefore can contain fiber sections and/or cellulose nanofilaments sections. Fines are not a homogenous material and are only used to represent a class of material with a defined length limitation.

Preferred embodiments of the absorbent towel paper webs of the present disclosure comprise from about 0.05 to about 20.0%, or from about 1.0% to about 10.0%, or from about 1.0% to about 3.0% of cellulose nanofilaments.

The cationic strengthening polymers useful in this disclosure include without limitation cationic water-soluble resins. These resins impart wet strength to paper sheets and are well known in paper making art. Such resins include polyamide epichlorohydrin (PAE), urea-formaldehyde resins, melamine formaldehyde resins, polyacrylamide resins, dialdehyde starches, and mixtures thereof.

In some embodiments, other strength agents can be utilized to further enhance the strength of a tissue product. As used herein, a "wet strength agent" is any material that, when added to pulp fibers can provide a resulting web or sheet with a wet geometric tensile strength to dry geometric tensile strength ration in excess of about 0.1. Typically, these are termed either "permanent" wet strength or "temporary" wet strength agents. As is well known in the art, temporary and permanent wet strength agents may also sometimes function as dry strength agents to enhance the strength of the tissue product when dry. The listing of optional chemical ingredients is intended to barely exemplary in nature and are not meant to limit the scope of the disclosure. Other materials may be included as well so long as they do not interfere or counteract the advantages of the present disclosure.

Wet strength agents may be applied in various amounts, depending on the desired characteristics of the web. For instance, in some embodiments, the total wet strength agents added can be between about 0.5 to 50 kg/T in some embodiments, between 2 to about 15 kg/T, and in some embodiments, between about 3 to about 5 kg/T of the strength agents can be incorporated into any layer of the multi-layer tissue web. The cationic wet strength resins useful in this disclosure include without limitation cationic water-soluble resins. These resins impart wet strength to paper sheets and are well known in paper making art. This resin may impart either temporary or permanent wet strength to the fibrous sheet. Such resins include polyamide epichlorohydrin (PAE), urea-formaldehyde resins, melamine formaldehyde resins, polyacrylamide resins, dialdehyde starches, and mixtures thereof.

The strength additive may be selected from the group consisting of permanent wet strength resins, temporary wet strength resins, dry strength additives, and mixtures thereof. If permanent wet strength is desired, the chemical papermaking additive can be chosen from the following group of chemicals: polyamidpichlorohydrin, polyacrylamides, insolubilized polyvinyl alcohol; urea formaldehyde; polyethyleneimine; and chitosan polymers. Polyamide epichlorohydrin resins are cationic wet strength resins which have been found to be of particular utility. Suitable types of such resins are described in U.S. Pat. Nos. 3,700,623, and 3,772,076. One commercial source of a useful polyamide epichlorohydrin resins is Solenis LLC. of Wilmington, DE., which markets such resin under the trademark KYMENE® 557H.

Polyacrylamide resins have also been found to be of utility as wet strength resins. These resins are described in U.S. Pat. Nos. 3,556,932 and 3,556,933. One commercial source of polyacrylamide resins is Kemira Oyj of Helsinki, Finland, which markets one such resin under the marketed as Fennorez.

Still other water-soluble cationic resins finding utility in this disclosure are urea formaldehyde and melamine formaldehyde resins. The more common functional groups of these polyfunctional resins are nitrogen containing groups such as amino groups and methylol groups attached to nitrogen. Polyethyleneimine type resins may also find utility in the present disclosure.

If temporary wet strength is desired, the chemical papermaking additive can be chosen from the following group of chemicals: cationic dialdehyde starch-based resin (such as Caldas produced by Japan Carlet, National Starch 78-0080 or Cobond® 1000, both produced by National Starch and Chemical Corporation); and dialdehyde starch. Modified starch temporary wet strength resins are also described in U.S. Pat. No. 4,675,394 Preferred temporary wet strength resins include those described in U.S. Pat. No. 4,981,557. Another example of a preferred temporary wet strength resin is Fennorez®, a commercially available modified polyacrylamide resin manufactured by Kemira Oyj of Helsinki, Finland. If dry strength is desired, the chemical papermaking additive can be chosen from the following group of chemicals. Polyacrylamide (such as combinations of Cypro® 514 and ACCOSTRENGTH® 711 produced by American Cyanamid of Wayne, N.J.); starch (such as corn starch or potato starch); polyvinyl alcohol (such as AIRVOL® 540 produced by Air Products Inc of Allentown, PA); guar or locust bean gums; and/or carboxymethyl cellulose (such as Calexes® from CP Kelco, Atlanta, GA). In general, suitable starch for practicing the present disclosure is characterized by water solubility, and hydrophilicity. Exemplary starch materials include corn starch and potato starch, albeit it is not intended to thereby limit the scope of suitable starch materials; and waxy corn starch that is known industrially as amioca starch is particularly preferred. Amioca starch differs from common corn starch in that it is entirely amylopectin, whereas common corn starch contains both amylopectin and amylose. Various unique characteristics of amioca starch are further described in "Amioca—The Starch From Waxy Corn", H. H. Schopmeyer, Food Industries, December 1945, pp. 106-108 (Vol. pp. 1476-1478). The starch can be in granular or dispersed form albeit granular form is preferred. The starch is preferably sufficiently cooked to induce swelling of the granules. More preferably, the starch granules are swollen, as by cooking, to a point just prior to dispersion of the starch granule. Such highly swollen starch granules shall be referred to as being "fully cooked." The conditions for dispersion in general can vary depending upon the size of the starch granules, the degree of crystallinity of the granules, and the amount of amylose present. Fully cooked amioca starch, for example, can be prepared by heating an aqueous slurry of about 4% consistency of starch granules at about 190° F. (about 88° C.) for between about 30 and about 40 minutes. Other exemplary starch materials which may be used include modified cationic starches such as those modified to have nitrogen containing groups such as amino groups and methylol groups attached to nitrogen, available from National Starch and Chemical Company, (Bridgewater, N.J.). Such modified starch materials have heretofore been used primarily as a pulp furnish additive to increase wet and/or dry strength. However, when applied in accordance with this disclosure by application to a tissue paper web they may have reduced effect on wet strength relative to wet-end addition of the same modified starch materials. Considering that such modified starch materials are more expensive than unmodified starches, the latter have generally been preferred. These wet and dry strength resins may be added to the pulp furnish in addition to being added by the process described in this disclosure. It is to be understood that the addition of chemical compounds such as the wet strength and temporary wet strength resins discussed above to the pulp furnish is optional and is not necessary for the practice of the present development.

In preferred embodiments of the process of the present disclosure, the cationic strengthening polymer is added to the furnish in an amount ranging from about 0.25% to about 5.0%, or from about 0.5% to about 3.0%, or from about 1.0% to about 2.0% by weight of the dry fiber basis of the absorbent towel or sanitary tissue product being produced. In general, processes to manufacture absorbent towel products add higher levels of polymers where the polymer is added up to about 5.0%, or up to about 3.0% or up to about 1.5%. Conversely, processes to produce sanitary tissue products add slightly lower levels of strengthening polymers where the polymer if added up to about 3.0% or up to about 1.5%.

It is understood and contemplated in the present disclosure that polymer and polymer solutions may be produced now or in the future that have a higher concentration or activity level than those currently available to paper making manufacturers, that could result in embodiments that would be equivalent to the absorbent towel paper webs at levels below the limitations disclosed in the present disclosure.

The fibrous structure of the present disclosure may be homogeneous or may be layered. If layered, the fibrous structures may comprise at least two and/or at least three and/or at least four and/or at least five layers.

"Basis weight as used herein is the weight per unit area of a sample reported in lbs/3000 $ft^2$ or $g/m^2$. The fibrous towel structures and/or sanitary tissue products of the present disclosure may exhibit a basis weight of between 10 $g/m^2$ to about 120 $g/m^2$ and/or from about 14 $g/m^2$ to about 80 $g/m^2$ and/or from about 20 $g/m^2$ to about 60 $g/m^2$.

Basis weight is measured by preparing one or more samples of a certain area ($m^2$) and weighing the sample(s) of a fibrous structure according to the present disclosure and/or a paper product comprising such fibrous structure on a top loading balance with a minimum resolution of 0.01 g. The balance is protected from air drafts and other disturbances using a draft shield.

Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

"Sanitary tissue product" as used herein means a soft low density (i.e., less than about 0.15 $g/cm^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product prepared according to the present disclosure may be subjected to any suitable post processing including, but not limited to printing, embossing, calendaring, slitting, folding, combining with other fibrous structures and/or winding, and the like.

In a preferred embodiment of the absorbent towel paper web of the towel paper product, the fibrous structure comprises from about 20% to 90% percent by weight of a refined softwood pulp fiber mixture. The long fiber softwood pulp fiber mixture comprises from about 18.5% to about 88.5% by weight of the dry fiber basis of the towel product of a soft wood pulp, wherein the soft wood pulp is optionally refined or not refined prior to combination with a cationic strengthening polymer. The cationic strengthening polymer is added to the aqueous stream in a manner that enables from about 0.25% to about 5.0% by weight of the polymer to be added to the paper making furnish. After combination of the soft wood pulp and cationic polymer, from about 0.05% to about 20% by weight of the dry fiber basis of the towel paper web of cellulose nanofilaments are blended into the stream. In this embodiment of the disclosure this soft wood fiber, cellulose nanofilament and cationic stream is then blended with 10% to 55% by weight of the dry fiber basis of the towel product with of hardwood pulp fiber mixture and formed into the fibrous sheet by any of the processes discussed above. The absorbent towel paper web has a Total Tensile Index of from about 6 N·m/g to about 12 N·m/g, a Mean Square Dry Tensile index of 5 N·m/g to about 10 N·m/g, a Total Dry Tensile Strength value ranging from about 300 N/m to about 600 N/m and a Cross-directional Wet Tensile Strength to Cross-directional Dry Tensile Strength Ratio of from about 0.20 to about 0.50. The two-ply absorbent towel paper product has a Total Tensile Strength Index of from about 8 N·m/g to about 20 N·m/g, a Total Dry Tensile Strength value ranging from about 500 N/m to about 1000 N/m, a Cross-directional Wet Tensile Strength to Cross-directional Dry Tensile Strength Ratio of from about 0.20 to about 0.50, and a Mean Square Dry Tensile Strength Index ranging from 4 N·m/g to about 10 N·m/g.

In another embodiment of the disclosure, the soft wood fiber stream is fed into a separate layer or layers of the paper making system and isolated from the 10% to 55% by weight hardwood pulp fiber stream. This process embodiment produces a higher strength absorbent towel web product having a Total Tensile Strength index of from about 6 N·m/g to about 12 N·m/g a Cross-directional Wet Tensile Strength to Cross-directional Dry Tensile Strength Ratio of from about 0.20 to about 0.50, and a Mean Square Dry Tensile Strength Index ranging from 5 N·m/g to about 10 N·m/g.

The absorbent paper towel webs of the present application also comprise of a cationic strengthening polymer. Generally, cationic strengthening polymers may be applied in various amounts, depending on the desired characteristics of the web. For instance, in some embodiments, the total wet strength agents added can be between about 0.5 to 50 kg/T in some embodiments, between 2 to about 15 kg/T, and in some embodiments, between about 3 to about 5 kg/T. The strength polymers can be incorporated into any layer of the multi-layer tissue web.

Optional Ingredients—Chemical Papermaking Additives:

If desired, various chemical additive compositions may optionally be added to the absorbent paper towel web to further enhance consumer desired benefits such as softness, lower lint, absorbency, and/or sheet flexibility. The chemical additives are selected from the group consisting of debonders, silicone softening additives, non-silicone softening additives, noncationic strengthening additives, absorbency additives and aesthetic additives.

Debonders—

A chemical debonder can also be applied to soften the web. Specifically, a chemical debonder can reduce the amount of hydrogen bond within one or more layers of the web, which results in a softer product. Depending upon the desired characteristics of the resulting tissue product, the debonder can be applied in an amount between 0% to about 3.0%, or from about 0.1% to about 2.0% or from about 0.5% to about 1.0% by weight of the dry fiber basis of the paper web. The debonder can be incorporated into any layer of the single or multilayer tissue web.

Suitable debonders for use as softener additives in the present disclosure include both cationic and noncationic surfactants, with cationic surfactants being preferred. Noncationic surfactants include anionic, nonionic, amphoteric, and zwitterionic surfactants. Preferably, the surfactant is substantially nonmigratory in situ after the tissue paper has been manufactured in order to substantially obviate post-manufacturing changes in the tissue paper's properties which might otherwise result from the inclusion of surfactant. This may be achieved, for instance, through the use of surfactants having melt temperatures greater than the temperatures commonly encountered during storage, shipping, merchandising, and use of tissue paper product embodiments of the disclosure: for example, melt temperatures of about 50° C. or higher.

The level of noncationic surfactant applied to tissue paper webs to provide the aforementioned softness/tensile benefit ranges from the minimum effective level needed for imparting such benefit, on a constant tensile basis for the end product, to about 2%, or between about 0.01% and about 2% noncationic surfactant is retained by the web; or between about 0.05% and about 1.0%; or between about 0.05% and about 0.3%. The surfactants preferably have alkyl chains with eight or more carbon atoms. Exemplary anionic surfactants are linear alkyl sulfonates, and alkylbenzene sulfonates. Exemplary nonionic surfactants are alkyl glycosides including alkyl glycoside esters such as CRODESTA® SL-40 which is available from Croda, Inc. (New York, N.Y.); alkyl glycoside ethers as described in U.S. Pat. No. 4,011, 389, alkylpolyethoxylated esters such as PEGOSPERSE® 200 ML available from Glyco Chemicals, Inc. (Greenwich, Conn.); alkyl polyethoxylated ethers and esters such as NEODOLR® 25-12 available from Shell Chemical Co; sorbitan esters such as SPAN® 60 from ICI America, Inc, ethoxylated sorbitan esters, propoxylated sorbitan esters, mixed ethoxylated propoxylated sorbitan esters, and polyethoxylated sorbitan alcohols such as TWEEN® 60 also from ICI America, Inc. Alkylpolyglycosides are particularly preferred for use in the present disclosure. The above listings of exemplary surfactants are intended to be merely exemplary in nature and are not meant to limit the scope of the disclosure.

Silicones—

If a chemical softener that functions primarily by imparting a lubricous feel is desired a polysiloxane or "silicone" can be used. Depending upon the desired characteristics of the resulting tissue product, the silicone can be applied in an amount between 0% to about 3.0%, or from about 0.1% to about 2.0%, or from about 0.5% to about 1.0% by weight of the dry fiber basis of the paper web. The silicone can be incorporated into any layer of the single or multilayer tissue web. Suitable silicone compounds for use in the present disclosure are described in detail below.

The polysiloxane compounds preferably have monomeric siloxane units of the following structure:

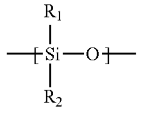

wherein, $R_1$ and $R_2$, for each independent siloxane monomeric unit can each independently be hydrogen or any alkyl, aryl, alkenyl, alkaryl, arakyl, cycloalkyl, halogenated hydrocarbon, or other radical. Any of such radicals can be substituted or unsubstituted. $R_1$ and $R_2$ radicals of any particular monomeric unit may differ from the corresponding functionalities of the next adjoining monomeric unit. Additionally, the polysiloxane can be either a straight chain, a branched chain or have a cyclic structure. The radicals $R_1$ and $R_2$ can additionally independently be other siliceous functionalities such as, but not limited to siloxanes, polysiloxanes, silanes, and polysilanes. The radicals $R_1$ and $R_2$ may contain any of a variety of organic functionalities including, for example, alcohol, carboxylic acid, aldehyde, ketone and amine, amide functionalities, with amino functional silicone compounds being preferred. Exemplary alkyl radicals are methyl, ethyl, propyl, butyl, pentyl, hexyl, octyl, decyl, octadecyl, and the like. Exemplary alkenyl radicals are vinyl, allyl, and the like. Exemplary aryl radicals are phenyl, diphenyl, naphthyl, and the like. Exemplary alkaryl radicals are toyl, xylyl, ethylphenyl, and the like. Exemplary arakyl radicals are benzyl, alpha-phenylethyl, beta-phenylethyl, alpha-phenyl butyl, and the like. Exemplary cycloalkyl radicals are cyclobutyl, cyclopentyl, cyclohexyl, and the like. Exemplary halogenated hydrocarbon radicals are chloromethyl, bromoethyl, tetrafluorethyl, fluorethyl, trifluorethyl, trifluorotoyl, hexafluoroxylyl, and the like. References disclosing polysiloxanes include U.S. Pat. Nos. 2,826,551, 3,964,500, 4,364,837, 5,059,282, and British Patent No. 849,433. Also, Silicone Compounds, pp 181-217, distributed by Petrarch Systems, Inc., 1984, contains an extensive listing and description of polysiloxanes in general.

Strength Additives—

The strength additive may be applied to the tissue paper web alone, simultaneously with, prior to, or subsequent to the addition of softener, absorbency, and/or aesthetic additives. At least an effective amount of a strength additive, preferably starch, to provide lint control and concomitant strength increase upon drying relative to a non-binder treated but otherwise identical sheet is preferably applied to the sheet. Preferably, between about 0.01% and about 2.0% of a strength additive is retained in the dried sheet, calculated on a dry fiber weight basis; and, more preferably, between about 0.1% and about 1.0% of a strength additive material, preferably starch-based, is retained.

Softening Additives—

Any surfactant other than the chemical papermaking additive emulsifying surfactant material, is hereinafter referred to as "surfactant," and any surfactant present as the emulsifying component of emulsified chemical papermaking additives is hereinafter referred to as "emulsifying agent". The surfactant may be applied to the tissue paper alone or simultaneously with, after, or before other chemical papermaking additives. In a typical process, if another additive is present, the surfactant is applied to the cellulosic substrate simultaneously with the other additive(s). It may also be desirable to treat a debonder containing tissue paper with a relatively low level of a binder for lint control and/or to increase tensile strength.

If a chemical softener that functions primarily by imparting a lubricous feel is desired, it can be chosen from the following group of chemicals. Organic materials (such as mineral oil or waxes such as paraffin or carnauba, or lanolin); and polysiloxanes (such as the compounds described in U.S. Pat. No. 5,059,282). Suitable polysiloxane compounds for use in the present disclosure are described in detail below.

If a chemical softener that functions primarily by plasticizing the structure is desired, it can be chosen from the following group of chemicals: polyethylene glycol (such as PEG 400®); dimethylamine; and/or glycerin.

If a cationic chemical softener that functions primarily by debonding is desired, it can be chosen from the following group of chemicals. Cationic quaternary ammonium compounds (such as dihydrogenated tallow dimethyl ammonium methyl sulfate (DTDMAMS) or dihydrogenated tallow dimethyl ammonium chloride (DTDMAC) both produced by Witco Corporation of Greenwich, Conn.; Berocel 579 (produced by Eka Nobel of Stennungsund, Sweden); materials described in U.S. Pat. Nos. 4,351,699 and 4,447,294 issued to Osborn; and/or diester derivatives of DTDMAMS or DTDMAC.) In particular, quaternary ammonium compounds having the formula:

$$(R_1)_{4-m}—N^+—[R2]_mX^-$$

where:

- m is 1 to 3;
- each $R_1$ is a $C_1$-$C_8$ alkyl group, hydroxyalkyl group, hydrocarbyl or substituted hydrocarbyl group, alkoxylated group, benzyl group, or mixtures thereof; each $R_2$ is a $C_9$-$C_{41}$ alkyl group, hydroxyalkyl group, hydrocarbyl or substituted hydrocarbyl group, alkoxylated group, benzyl group, or mixtures thereof; and $X^-$ is any softener-compatible anion are suitable for use in the present disclosure. Preferably, each $R_2$ is $C_{16}$-$C_{18}$ alkyl, most preferably each $R_2$ is straight-chain $C_{18}$ alkyl. Preferably, each $R_1$ is methyl and $X^-$ is chloride or methyl sulfate. Optionally, the $R_2$ substituent can be derived from vegetable oil sources. Biodegradable ester-functional quaternary ammonium compound having the formula:

$$(R_1)_{4-m}—N^+—[(CH_2)_n—Y—R_2]_mX^-$$

where:

- each Y=—O—(O)C—, or —C(O)—O—;
- m=1 to 3; preferably, m=2;
- each n=1 to 4; preferably, n=2;
- each $R_1$ substituent is a short chain $C_1$-$C_6$, preferably $C_1$-$C_3$, alkyl group, e.g., methyl (most preferred), ethyl, propyl, and the like, hydroxyalkyl group, hydrocarbyl group, benzyl group or mixtures thereof; each $R_2$ is a long chain, at least partially unsaturated (IV of greater than about 5 to less than about 100, preferably from about 10 to about 85), $C_{11}$-$C_{23}$ hydrocarbyl, or substituted hydrocarbyl substituent and the counter-ion, $X^-$, can be any softener compatible anion, for example, acetate, chloride, bromide, methyl sulfate, formate, sulfate, nitrate and the like can also be used in the present disclosure. Preferably, the majority of $R_2$ comprises fatty acyls containing at least 90% $C_{18}$-$C_{24}$ chain length.

More preferably, the majority of $R_2$ is selected from the group consisting of fatty acyls containing at least 90% $C_{18}$, $C_{22}$ and mixtures thereof.

Other types of suitable quaternary ammonium compounds are described in European Patent No. 0 688 901 A2.

Tertiary amine softening compounds can also be used in the present disclosure. Examples of suitable tertiary amine softeners are described in U.S. Pat. No. 5,399,241.

Absorbency Additives

If enhanced absorbency is desired, surfactants may be used to treat the paper webs of the present disclosure. The level of surfactant, if used, in one embodiment, can be from about 0.01% to about 2% by dry fiber weight basis of the tissue web. In one embodiment the surfactants have alkyl chains with eight or more carbon atoms. Alternatively, cationic softener active ingredients with a high degree of unsaturated (mono and/or poly) and/or branched chain alkyl groups can greatly enhance absorbency.

If an absorbency aid is desired that enhances the rate of absorbency it can be chosen from the following group of chemicals: polyethoxylates (such as PEG 400); alkyl ethoxylated esters (such as PEGOSPERSE® 200 ML from Lonza Inc.); alkyl ethoxylated alcohols (such as Neodol®); alkyl polyethoxylated nonylphenols (such as IGEPAL CO® produced by Rhone-Poulenc/GAF), ethoxylate trimethyl pentanediol, and/or materials described in U.S. Pat. Nos. 4,959,125 and 4,940,513. In those instances where the surfactant debonder softener decreases wetting, a wetting agent, e.g., a second surfactant, may be added to the application solution. For example, a sorbitan stearate ester can be mixed with an alkyl polyethoxylated alcohol to produce a soft wettable paper.

Water soluble polyhydroxy compounds can also be used as absorbency aids and/or wetting agents. Examples of water-soluble polyhydroxy compounds suitable for use in the present disclosure include glycerol, polyglycerols having a weight average molecular weight of from about 150 to about 800 and polyoxyethylene and polyoxypropylene having a weight-average molecular weight of from about 200 to about 4000, or from about 200 to about 1000, or from about 200 to about 600. Polyoxyethylene having a weight average molecular weight of from about 200 to about 600 can be preferred. Mixtures of the above-described polyhydroxy compounds may also be used. For example, mixtures of glycerol and polyglycerols, mixtures of glycerol and polyoxyethylenes, mixtures of polyglycerols and polyoxyethylenes, etc. are useful in the present disclosure. A particularly preferred polyhydroxy compound is polyoxyethylene having a weight average molecular weight of about 400. This material is available commercially from the Union Carbide Company of Danbury, Conn. under the trade name "PEG-400".

If an absorbency aid is desired that decreases the rate of absorbency it can be chosen from the following group of chemicals. Alkyl ketene dimers (such as AQUAPELR® 360XC Emulsion manufactured by Hercules Inc., Wilmington, DE); fluorocarbons (such as Scotch Guard® by 3M of Minneapolis, MN) hydrophobic silicones (such as PDMS DC-200® by Dow Corning of Midland, MI), fluorotelomers (such as ZONYL® 7040 by Dupont of Wilmington, DE), etc.

The absorbency additive can be used alone or in combination with a strength additive. Starch based strength additives have been found to be the preferred binder for use in the present disclosure. Preferably, the tissue paper is treated with an aqueous solution of starch. In addition to reducing linting of the finished tissue paper product, low levels of starch also impart a modest improvement in the tensile strength of tissue paper without imparting boardiness (i.e., stiffness) which would result from additions of high levels of starch. Also, this provides tissue paper having improved strength/softness relationship compared to tissue paper which has been strengthened by traditional methods of increasing tensile strength: for example, sheets having increased tensile strength due to increased refining of the pulp; or through the addition of other dry strength additives. This result is especially surprising since starch has traditionally been used to build strength at the expense of softness in applications wherein softness is not an important characteristic: for example, paperboard. Additionally, parenthetically, starch has been used as a filler for printing and writing paper to improve surface printability.

Aesthetic Additives

If an aesthetic additive is desired, it can be chosen from the following group of chemicals: inks; dyes; perfumes; opacifiers (such as $TiO_2$ or calcium carbonate), optical brighteners, and mixtures thereof. The aesthetics of the paper can also be improved utilizing the process described in this disclosure. Inks, dyes, and/or perfumes are preferably added to the aqueous composition which is subsequently applied to the tissue paper web. The aesthetics additive may be applied alone or in combination with the wetting, softening, and/or strength additives.

The two-ply paper webs of the present disclosure have high dry tensile strength. The two-ply paper products have a Total Tensile Strength Index ranging from about 8 N·m/g to about 20 N·m/g. Preferred embodiments paper webs have a Total Tensile Strength Index ranging from about 10 N·m/g to about 18 N·m/g. Additionally, the soft sanitary tissue paper product may have a Mean Square Dry Tensile Strength Index ranging from 4 N·m/g to about 10 N·m/g. Measuring dry tensile strength separately, the two-ply paper webs of the present disclosure have a total Dry Tensile Strength ranging from about 500 N/m to about 1000 N/m, or from about 600 N/m to about 900 N/m, or from about 700 N/m to about 800 N/m.

The single ply paper webs have high dry tensile strength. The single ply paper webs of the present disclosure have a Total Dry Tensile Strength ranging from about 300 N/m to about 600 N/m for a single ply, with preferred single-ply embodiments having a Dry Tensile Strength ranging from about 350 N/m to about 500 N/m. The single ply paper webs produced on the paper machine of the present disclosure also have high Cross-directional (CD) wet tensile strength. The single ply embodiments of the paper webs have a Cross-directional (CD) Wet Tensile Strength ranging from about 25 N/m to about 80 N/m. Preferred embodiments paper webs have a Cross-directional Wet Tensile Strength ranging from about 30N·m/g to about 55 N·m/g. As measured separately, the paper webs of the present disclosure have a Cross-directional Wet Tensile Strength to Cross-directional Dry Tensile Strength Ratio ranging from about 0.20 to about 0.50 N/m, with preferred embodiments having a CD Wet Tensile Strength to CD Dry Tensile Strength Ratio ranging from about 0.295 to about 0.35. The paper webs have a Total Tensile Strength Index ranging from about 6 N·m/g to about 12 N·m/g. Preferred embodiments paper webs have a Total Tensile Strength Index ranging from about 7 N·m/g to about 10 N·m/g. Additionally, the soft sanitary tissue paper webs may have a Mean Square Dry Tensile Strength Index ranging from about 4 N·m/g to about 10 N·m/g.

Process for Making

In FIG. 1, a twin wire former having a papermaking headbox 1 injects or deposits a furnish of an aqueous suspension of papermaking fibers onto a plurality of forming fabrics, such as the outer forming fabric 5 and the inner forming fabric 3, thereby forming a wet tissue web 6. The forming process of the present disclosure may be any conventional forming process known in the papermaking industry. Such formation processes include, but are not limited to, Fourdriniers, roof formers such as suction breast roll formers, and gap formers such as twin wire formers and crescent formers.

The wet tissue web 6 forms on the inner forming fabric 3 as the inner forming fabric 3 revolves about a forming roll 4. The inner forming fabric 3 serves to support and carry the newly-formed wet tissue web 6 downstream in the process as the wet tissue web 6 is partially dewatered to a consistency of about 10 percent based on the dry weight of the fibers. Additional dewatering of the wet tissue web 6 may be carried out by known paper making techniques, such as vacuum suction boxes, while the inner forming fabric 3 supports the wet tissue web 6. The wet tissue web 6 may be additionally dewatered to a consistency of at least about 20 percent, more specifically between about 20 to about 40 percent, and more specifically about 20 to about 30 percent.

The forming fabric 3 can generally be made from any suitable porous material, such as metal wires or polymeric filaments. For instance, some suitable fabrics can include, but are not limited to, Albany 84M and 94M available from Albany International (Albany, N.Y.) Asten 856, 866, 867, 892, 934, 939, 959, or 937; Asten Synweve Design 274, all of which are available from Asten Forming Fabrics, Inc. (Appleton, Wis.); and Voith 2164 available from Voith Fabrics (Appleton, Wis.). Forming fabrics or felts comprising nonwoven base layers may also be useful, including those of Scapa Corporation made with extruded polyurethane foam such as the Spectra Series.

The wet web 6 is then transferred from the forming fabric 3 to a transfer fabric 8 while at a solids consistency of between about 10 to about 40 percent, and particularly, between about 20 to about 30 percent. As used herein, a "transfer fabric" is a fabric that is positioned between the forming section and the drying section of the web manufacturing process.

Transfer to the transfer fabric 8 may be carried out with the assistance of positive and/or negative pressure. For example, in one embodiment, a vacuum shoe 9 can apply negative pressure such that the forming fabric 3 and the transfer fabric 8 simultaneously converge and diverge at the leading edge of the vacuum slot. Typically, the vacuum shoe 9 supplies pressure at levels between about 10 to about 25 inches of mercury. As stated above, the vacuum transfer shoe 9 (negative pressure) can be supplemented or replaced by the use of positive pressure from the opposite side of the web to blow the web onto the next fabric. In some embodiments, other vacuum shoes can also be used to assist in drawing the fibrous web 6 onto the surface of the transfer fabric 8.

Typically, the transfer fabric 8 travels at a slower speed than the forming fabric 3 to enhance the MD and CD stretch of the web, which generally refers to the stretch of a web in its cross (CD) or machine direction (MD) (expressed as percent elongation at sample failure). For example, the relative speed difference between the two fabrics can be from about 1 to about 30 percent, in some embodiments from about 5 to about 20 percent, and in some embodiments, from about 10 to about 15 percent. This is commonly referred to as "rush transfer". During "rush transfer", many of the bonds of the web are believed to be broken, thereby forcing the sheet to bend and fold into the depressions on the surface of the transfer fabric 8. Such molding to the contours of the surface of the transfer fabric 8 may increase the MD and CD stretch of the web. Rush transfer from one fabric to another can follow the principles taught in any one of the following patents, U.S. Pat. Nos. 5,667,636, 5,830,321, 4,440,597, 4,551,199, and 4,849,054.

The wet tissue web 6 is then transferred from the transfer fabric 8 to a through-air drying fabric 11. Typically, the transfer fabric 8 travels at approximately the same speed as the through-air drying fabric 11. However, it has now been discovered that a second rush transfer may be performed as the web is transferred from the transfer fabric 8 to a through-air drying fabric 11. This rush transfer is referred to herein as occurring at the second position and is achieved by operating the through-air drying fabric 11 at a slower speed than the transfer fabric 8. By performing rush transfer at two distinct locations, i.e., the first and the second positions, a tissue product having increased CD stretch may be produced.

In addition to rush transferring the wet tissue web from the transfer fabric 8 to the through-air drying fabric 11, the wet tissue web 6 may be macroscopically rearranged to conform to the surface of the through-air drying fabric 11 with the aid of a vacuum transfer roll 12 or a vacuum transfer shoe like the vacuum shoe 9. If desired, the through-air drying fabric 11 can be run at a speed slower than the speed of the transfer fabric 8 to further enhance MD stretch of the resulting absorbent tissue product. The transfer may be carried out with vacuum assistance to ensure conformation of the wet tissue web 6 to the topography of the through-air drying fabric 11.

While supported by the through-air drying fabric 11, the wet tissue web 6 is dried to a final consistency of about 94 percent or greater by a through-air dryer 13. The web 15 then passes through the winding nip between the reel drum 22 and the reel 23 and is wound into a roll of tissue 25 for subsequent converting, such as slitting cutting, folding, and packaging.

The web is transferred to the through-air drying fabric for final drying preferably with the assistance of vacuum to ensure macroscopic rearrangement of the web to give the desired bulk and appearance. The use of separate transfer and through-air drying fabrics can offer various advantages since it allows the two fabrics to be designed specifically to address key product requirements independently. For example, the transfer fabrics are generally optimized to allow efficient conversion of high rush transfer levels to high MD stretch while through-air drying fabrics are designed to deliver bulk and CD stretch. It is therefore useful to have moderately coarse and moderately three-dimensional transfer fabrics and through-air drying fabrics which are quite coarse and three dimensional in the optimized configuration. The result is that a relatively smooth sheet leaves the transfer section and then is macroscopically rearranged (with vacuum assist) to give the high bulk, high CD stretch surface topology of the through-air drying fabric. Sheet topology is completely changed from transfer to through-air drying fabric and fibers are macroscopically rearranged, including significant fiber-fiber movement.

The drying process can be any non-compressive or compressive drying method which tends to preserve the bulk or thickness of the wet web including, without limitation, through-air drying, infra-red radiation, microwave drying, Valmet NTT, Voith ATMOS, etc. Because of its commercial availability and practicality, through-air drying is well known and is one commonly used means for non-compressively drying the web for purposes of this disclosure. Suitable through-air drying fabrics include, without limitation, fabrics with substantially continuous machine direction ridges whereby the ridges are made up of multiple warp strands grouped together, such as those disclosed in U.S. Pat. No. 6,998,024. Other suitable through-air drying fabrics include those disclosed in U.S. Pat. No. 7,611,607, particularly the fabrics denoted as Fred (t1207-77), Jeston (t1207-6) and Jack (t1207-12). The web is preferably dried to final dryness on the through-air drying fabric, without being pressed against the surface of a Yankee dryer, and without subsequent creping.

Once the wet tissue web 6 has been non-compressively dried, thereby forming the dried tissue web 15, it is possible to crepe the dried tissue web 15 by transferring the dried tissue web 15 to a Yankee dryer prior to reeling, or using alternative foreshortening methods such as micro creping as disclosed in U.S. Pat. No. 4,919,877.

In the wound product, it is often advantageous to wind the product with the softest side facing the consumer, and hence the shearing process to increase the softness of this side is preferred. However, it is also possible to treat the air side of the web rather than the fabric side, and in these embodiments, it would be possible to increase the air-side softness to a level higher than that of the fabric side.

The process of the present disclosure is well suited to forming multi-ply tissue products. The multi-ply tissue products can contain two plies, three plies, or a greater number of plies. In one particular embodiment, a two-ply rolled tissue product is formed according to the present disclosure in which both plies are manufactured using the same papermaking process, such as, for example, uncreped through-air dried. However, in other embodiments, the plies may be formed by two different processes. Generally, prior to being wound in a roll, the first ply and the second ply are attached together. Any suitable manner for laminating the webs together may be used. For example, the process includes a crimping device that causes the plies to mechanically attach together through fiber entanglement. In an alternative embodiment, however, an adhesive may be used in order to attach the plies together.

Processes of Converting and Finishing

The absorbent towel webs prepared according to the present disclosure may be subjected to any suitable post processing including, but not limited to, printing, embossing, calendaring, slitting, folding, combining with other fibrous structures, and the like to form the final two-ply absorbent towel paper product.

This invention relates to two ply paper toweling and is particularly concerned with the combination of two differential density plies to create a structure with unique and superior CD wet tensile to CD dry tensile ratio. The invention contemplates many previously taught past means of combining two pile which include paper towels having the two outer sides smooth are known and taught in U.S. Pat. No. 1,964,700, for example, the toweling plies employed in such structure are webs which may be successively creped, embossed and united with their rough sides confronting to cause voids or air spaces between the plies. The smooth outer sides present a smooth feel and large effective area to the skin of a user while the internal air spaces limit the rate of liquid transfer between plies and inhibit towel disintegration upon towel wetting. The tendency of multi-ply toweling to separate in use or in cutting, etc., is recognized in U.S. Pat. No. 1,961,914 and provision made for adhesively uniting the plies merely locally or at their edges. U.S. Pat. No. 1,786,781 teaches the provision of an adhesive in toweling, which adhesive is water adsorptive, thus avoiding the objection to some adhesives that they tend to reduce the towel capacity for drying. Adhesive application between plies may take many forms such as the adhesive dots of U.S. Pat. No. 1,786,781 or the application employed in heavy embossing actions such as illustrated in U.S. Pat. No. 2,978,006, for example. Alternatively, the adhesive may be applied as a size along compressed lines in the toweling to thereby strengthen the towel around absorbent towel areas created by passing the material through rolls having small pockets as set out in U.S. Pat. No. 1,033,992 or 1,900,257. U.S. Pat. No. 3,708,366 teaches us how to conduct embossing actions in successive nips with one ply being subjected to plural embossings and the second to only one such action thereby limiting the mechanical pressing action on one toweling ply as desired, thereby controlling its absorbency; also, the mechanical arrangement may be simplified to a single stack of rolls embodying embossing and back-up rolls and occupying a minimum of space. The product itself may include adhesive applied only in controlled areas and amounts, and, if desired, the embossing action alone may be relied upon for ply adhesion. The adhesive, when employed, is preferably applied in small discrete amounts to avoid final product stiffening. Any of a number of adhesives are useful such as polyvinyl acetate emulsions, aqueous solutions of polyvinyl alcohol, synthetic latices and the like. Preferably, in the present instance, they are somewhat viscous and quick drying to limit web penetration and assure rapid development of bonding.

Patent U.S. Pat. No. 4,276,338 A teaches us that the essence of the towel structure is an absorbent body comprising two adjacent layers intimately joined together in a generally parallel and coextensive alignment, so that a major face of a first layer is intimately laminated to a major face of a second layer. The low-density regions of the first layer are arranged, with respect to the low-density regions of the second layer, so that the percentage of overlap of low-density regions of the respective layers is minimized. In a most preferred embodiment of the invention the percentage of overlap of the low-density regions of the respective layers is zero. It is difficult, however, to affect a complete lack of overlap of the first and second layers of the absorbent material in an operational setting. Accordingly, a percentage of overlap of greater than zero may be tolerated, although at the expense of some loss of performance. The maximum level of overlap within the scope of the present invention is defined by a random orientation of the layers, in which the first and second layers are joined without regard to the alignment of the holes and analyzed for percentage of overlap. A preferred maximum level of overlap is a percentage of overlap which is slightly less than the percentage of overlap observed in a randomly aligned structure. Clearly outside of the scope of the present invention are two-layer structures in which all of the low-density regions substantially overlap.

Certain properties must be present in order for an absorbent body to be within the scope of the present invention. First, the major faces of the respective layers which are joined together must be immediately adjacent each other, so that the amount of intermediate material must be minimal if the invention is to function properly. This is not to exclude the possibility that a minor amount of such things as powdered "super-sorbers" (e.g. -starch-acrylonitrile copolymers and the like) may be disposed between the layers. By laminating and gluing, the structure is capable of substantially retaining its novel alignment while in use. In one (highly preferred) mode of the present invention, two identical layers of sheet material are laminated to form a "two-sided" sheet of which each (exterior) opposed major face is a working face.

In another mode of practicing the present invention, two nonidentical layers of materials are joined together to form a laminar structure which may have one or more working faces, depending on whether one or more exterior major faces have all of the necessary attributes of a working face.

Without departing from the present invention, the two-layer structure described herein may have additional layers juxtaposed to its exterior portions. A first example of such a layer is a further absorbent layer on the side of the novel structure of the present invention away from the working face thereof, to increase the absorbent capacity of the structure. A second example of additional layers is a structure in which the two layers of the present invention occupy an interior region of an absorbent body, so that absorbent layers are found exterior to each working layer of the absorbent structure of the present invention. The utility of such a disposition of the structure of the present invention would be to distribute a fluid which has already been captured by the absorbent body. (It will be realized in connection with the immediately preceding embodiment that a "working face" as defined herein need not be an exterior face of the ultimate absorbent article.)

In another embodiment of the invention a layer may be interposed between a working face of the structure of the present invention and the fluid which is to be treated with the absorbent body. For example, an open scrim of abrading material may be juxtaposed to a working face of the present structure to increase the longevity and utility of the completed article to scrub surfaces.

Dissimilar materials may be joined as taught herein in order to provide an absorbent structure with special properties. For example, materials with differing hydrophilicity or pore size may be joined as taught herein to produce a composite material with a desirable hydrophilicity or pore size gradient.

Articles having many shapes and configurations may be made which incorporate the features of the present invention. As described above, the preferred embodiment of the invention comprises two flat, generally parallel coextensive layers joined together to form a two-sided structure. But this does not limit the spectrum of possible structures.

For one example, a structure of the present invention may comprise a thin sheet of material having a working face and an opposed major face, the latter of which is attached to a major face of a three-dimensional shape which defines a surface meeting the requirements of a layer as defined herein. In this case the three-dimensional shape could be a single layer, only part of which (an exterior surface) had the attributes of a layer required herein, without departing from the scope of the present invention.

The inventive structure may be attached to a handle or other implement to perform a cleaning or wiping function without departing from the structural requirements of the invention. Similarly, the structures of the present invention may be incorporated as one or more portions of a complete absorbent article, for example, as a series of discrete regions of a wipe.

The requirement of bonding of the respective layers was noted above; the two layers central to the present invention must be extensively bound together to maintain most or all of the low-density regions of the structure in the indicated alignment. Numerous bonding schemes may be devised to meet this alignment need without substantially diminishing the absorbent capacity and efficiency of the layers. In a preferred mode of practicing the invention discontinuous bonding is employed, which means that a multiplicity of discrete bonds is distributed over the inner surfaces of the layers, separated by regions (preferably a continuous region) of unbonded material.

Many techniques of bonding webs together to form absorbent structures are known, so no attempt will be made to catalogue every such technique. Suffice it to say that among the bonding techniques which are useful herein are spot gluing; thermal, ultrasonic, or radiative methods of fuse-bonding; stitching, sewing, and other methods of bonding which require the use of mechanical fastening devices; needle-punching and other means. The bonded areas may be randomly (but necessarily evenly) distributed on the layers or may form any of the patterns described above in the description of low-density regions.

It is important that no appreciable surface of the bonded layers be free of bonds, to prevent loss of the alignment of the layers. It has been found that this goal may be met if the following conditions are observed. The bonded area should comprise about 2% to about 25% of the surface area of the structure. The span between adjacent bond centers should be at least about ¼ inch (6 mm) and no more than about 2 inches (51 mm). The span of a particular bond should be no less than about 1/64 inch (0.40 mm) and no more than about ¼ inch (6 mm).

As explained in the Background Art section above, absorbent structures have many uses. Accordingly, the present invention is useful in the manufacture of many different types of absorbent articles.

The two-sided preferred embodiment of the invention noted above is useful by itself as a towel or wipe which exhibits improved wicking when compared with wipes which are not aligned in accordance with the present invention.

The present invention has utility in connection with bandages and absorbent dressings. The two-layer structures of the present invention may be used in such devices as a top sheet or as an element of the bandage absorbent material.

Catamenial devices of all kinds, such as tampons, panty shields, sanitary napkins and the like all require efficient and reliable absorption, so the materials of the present invention may be used as top sheets or absorbent elements in connection with such devices.

Diapers and other garments for the incontinent require extremely high absorbency to perform their intended function, but great bulk is undesirable in such garments, especially when they are to be worn unobtrusively under outer garments. Accordingly, the wicking benefits exhibited by the present two-layer materials well suit them for use as diaper top sheets and as elements of diaper absorbent cores.

The improvements of the present invention may also be used in surgical drapes, articles of clothing, and other articles. Finally, the uses of the present structure are not limited to disposable garments, for the technology described herein may equally be applied to durable garments.

Figure 2:
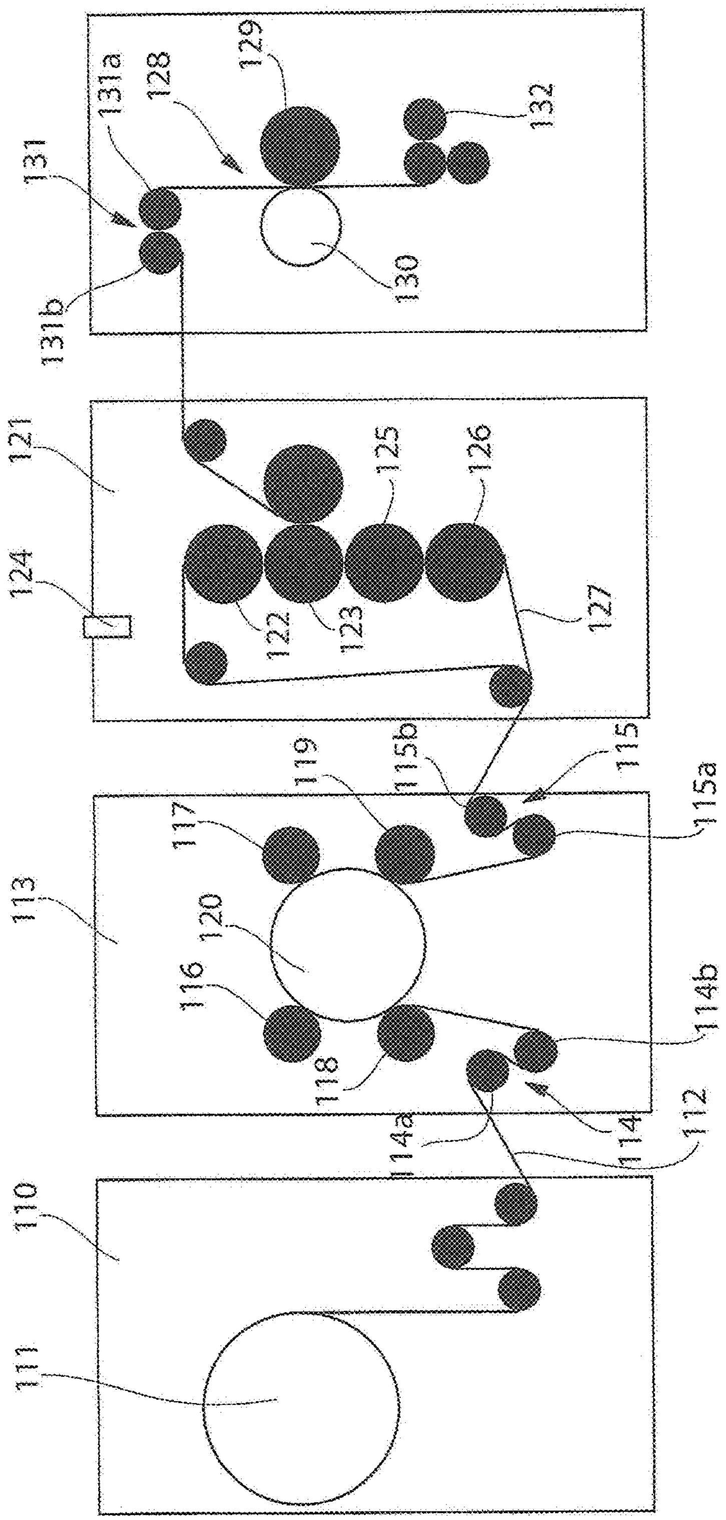
FIG. 2. is a schematic diagram of an example embodiment of an apparatus for printing and embossing absorbent paper products.

FIG. 2 shows an example process that can be used to combine two paper webs into an embossed and perforated two ply finished product. The exact converting process is not critical to the disclosure disclosed but serves as one method by which the converting transformation can be achieved.

The apparatus comprises an unwinder unit 110 for feeding a continuous paper web to the respective step of manufacture. In the unwinder unit 110 a parent roll 111 is unwound and fed into the respective unit in the form of a continuous paper web 112. The parent roll is a large roll of paper to be converted to multiple individual hygiene paper products in the form of sheets or rolls. Different parent rolls have different properties which effect the transport of the sheet through the apparatus. In the shown example, a continuous web is first transported to a printing unit 113. Ahead of the printing unit, i.e., upstream of the printing unit as seen in the direction of movement of the web through the apparatus, an in-feed nip 114 in the form of a S-wrap is located and constituted by two rolls 114 *a*, 114 *b*. Beyond the printing unit 113, i.e., downstream of the printing unit, an out-feed nip 115 in the form of an S-wrap is located and also has two rolls 115 *a* and 115 *b*. The printing unit is located between the in-feed nip 114 and the out-feed nip 115 and comprises four printing cylinders 116, 117, 118 and 119 and one backing roll 120 for all four printing cylinders. As will be apparent, the printing unit 113 is a four-color printing unit and, thus, comprises the four printing cylinders. However, other conventional printing unit arrangements and with a different number of colors are also possible, as is evident to the skilled person. In the drawing, the continuous web is transported from the unwinder unit 110 to the printing unit 113, that is, the continuous web 112 moves from the left to the right as seen in the drawing. Consequently, as seen in the direction of movement of the continuous web 112, the in-feed nip 114 is located upstream of the printing unit and the out-feed nip 115 is located downstream of the printing unit.

After leaving the out-feed nip 115, the web is transported to the embossing unit 121. The embossing unit 121 comprises an embossing roll 122 and a respective backing roll 123. A sensor 124, which is part of a feedback control (not shown) is located above one surface of the web. The speed ratio of the drive of the printing cylinders 116, 117, 118, 119 and the embossing cylinder 122 is adjusted, if required, to correct any deviations. Furthermore, the drives of the embossing cylinder 122 and the printing cylinder 116, 117, 118, 119 are connected via a gearbox or a master-slave servo drive.

As becomes apparent, the embossing unit 121 comprises a second embossing roll 125 and a second backing roll 126. For example, a second continuous web 127 may be fed to the embossing unit to be embossed and then laminated to the first continuous web 112 so as to enable the manufacture of a multi-ply paper product. Naturally, alternative arrangements of the embossing unit may be used and are well-known to the skilled person.

After embossing, the paper web is transported to a perforating unit 128 comprising a perforating roll 129 and a backing roll 130. An additional nip point 131, comprising two rolls 131 *a* and 131 *b* may be located upstream of the perforating unit 128. After perforation has been performed, the continuous web 112, or if two webs are laminated, the multi-ply web 127 is rewound by a rewinder unit 132. Thus, the end product can be provided in roll form such as for toilet paper rolls or a kitchen towel rolls. Alternatively, instead of the perforation unit, a cutting unit could be provided. In this case, the end product has the form of a single sheet such as, for example, napkins.

Figure 3:
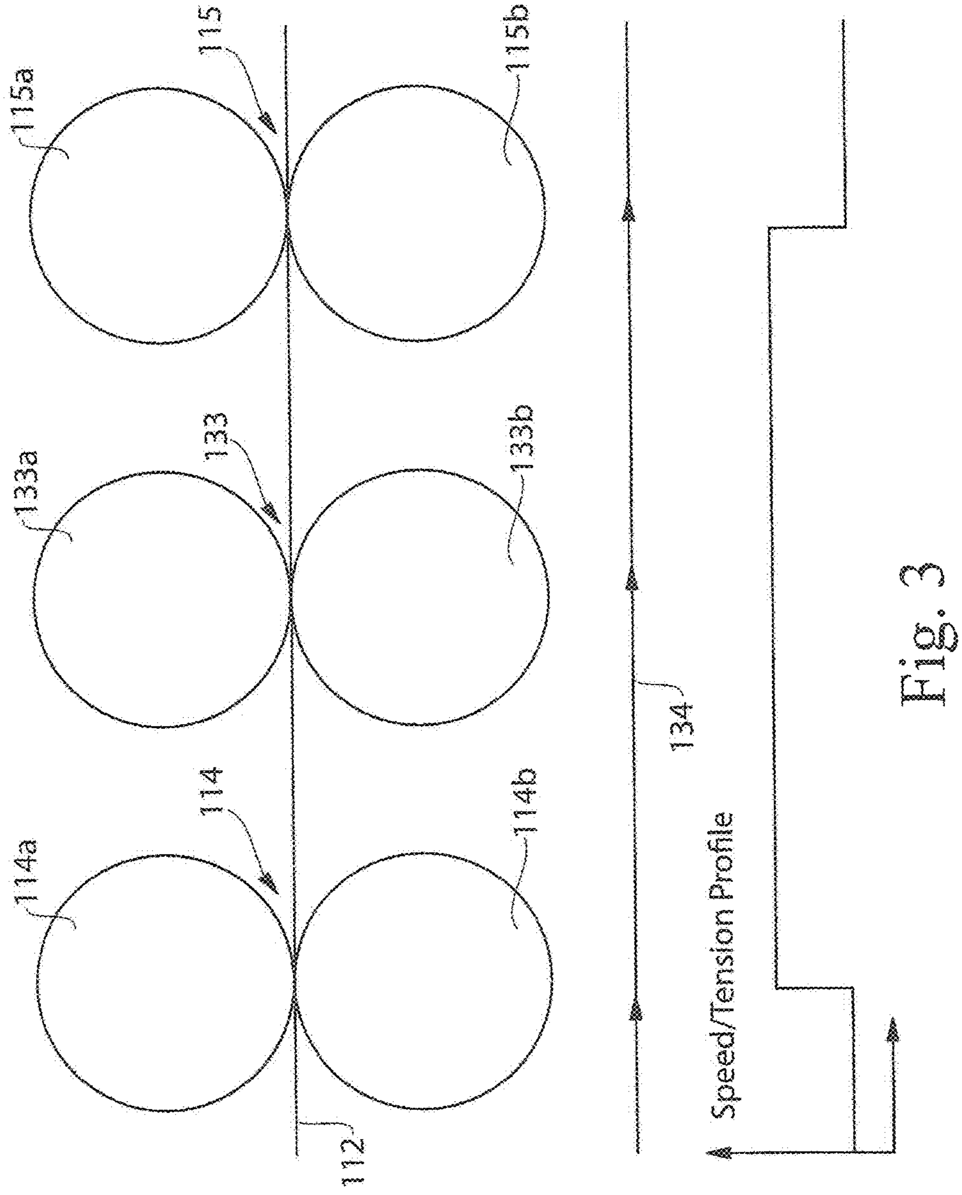
FIG. 3. is a schematic diagram of an example of a unit of an in-feed nip and out-feed nip embossing/printing process.

Referring now to FIG. 3, this schematically shows the arrangement of an in-feed nip 114 and an out-feed nip 115 enclosing only one printing nip 133. The printing nip 133 is defined by a printing roll 133*a* and a backing roll 133*b*. The drive of all three nips 114, 115 and 133 are coupled and the web speed in these nip points is identical so that the web passes the process without a change in its tension or elongation. After leaving the out-feed nip 115, the web is relaxed.

As may be taken from the corresponding speed/tension profile shown in FIG. 2, a print design having, for example, 200 mm repeat lengths on the printing cylinders can be printed on an elongated web. The web is elongated between the in-feed nip and the out-feed nip and, after leaving the out-feed nip, it is again relaxed. With an elongation of 5%, the 200 mm print design, which is printed onto the so elongated web, will shrink to about 190 mm on the web after leaving the out-feed nip 115. Thus, within the context of elastic elongation, the system can also be used to correct a basic mismatch between printing repeat lengths and any other repeat lengths, such as in the preferred embodiment with embossing and/or perforating. As an example, a range of 0% to 5% for a typical household towel will allow the adjustment of a repeat length by between 0 mm and 12 mm. The elongation of the web 112 is adjusted by the drives of the respective nip points. The arrow 134 indicates the direction of movement of the web 112.

Example 1: Absorbent Toweling

Absorbent towel paper webs were produced on a Through-Air Dried Tissue making paper machine or "Valmet Karlstad TAD" demonstration machine equipped with the following:

- Forming Wire: Microline XP or similar and Thinline Q592 of equivalent,
- TAD Fabric: Prolux 593 or equivalent homogeneous sheet,
- Chemistry: PAE/CMC pH ~8-9 ratio 3-4/1,
- Refining of only long fiber. Target ~550 CSF,
- Northern Softwood Kraft: Mercer Celgar NB SK ("BNSK")
- Hardwood Kraft: Eucalyptus: Brazilian ("BEuc")
- Cellulose Nanofilaments: As supplied from Kruger Canada
- Target properties:
  - High and mid-tier U.S. Toweling:
  - Basis Weight: 52 GSM
  - Total Tensile: 460-740 (N/m)
  - CD Tensile: 130-270 (N/m)
  - MD Tensile: 230-470 (N/m)
  - Total Tensile Index 6.5-11 N·m/g
  - Total wet Tensile: 100-160 (N/m)
  - CD Wet tensile: 30-60 (N/m)
  - MD Wet Tensile: 45-100 (N/m)
- Furnish Inclusion:

| | |
|---|---|
| BNSK | 55% |
| BEuc | 45% |

Cellulose Nanofilaments Added to BNSK Stream as BNSK Replacement

Part 1: Towel format. Hold process constant with the only change being the addition of cellulose nano filaments material at 2.5 and 5.0%. Following table shows the results:

| Condition | | 1 | 2 | 3 |
|---|---|---|---|---|
| NSK | (%) | 60 | 57.5 | 55 |
| Eucalyptus | (%) | 40 | 40 | 40 |
| NSK refining | kWh/t | 50 | 50 | 50 |
| PAE | kg/ton | 10 | 10 | 10 |
| CMC | kg/ton | 3.1 | 3.1 | 3.1 |
| Cellulose Nano filaments | (%) | 0 | 2.5 | 5.0 |
| Basis weight | g/m2 | 25.7 | 26.2 | 26.2 |
| Total Tensile Strength Index | Nm/g | 8.58 | 9.91 | 10.8 |
| Tensile CD | N/m | 173 | 218 | 239 |
| Wet Tensile CD | N/m | 50.4 | 65 | 81.5 |
| MD Tensile Index | Nm/g | 10.89 | 11.79 | 12.71 |
| CD tensile Index | Nm/g | 6.73 | 8.32 | 9.12 |
| Mean square Dry Tensile Strength index | Nm/g | 8.19 | 9.63 | 10.42 |
| Wet/Dry ratio | | 0.29 | 0.30 | 0.34 |

Observation: Holding paper making variables constant, the addition of CF predictably increases dry tensile from 173 to 239 N/M for the conditions listed above, but surprisingly increases the wet to dry tensile ratio from 0.29 to 0.34. This data was not expected from all previous information disclosed regarding CF fibers.

Part 2: Towel Format Reel Data when the product was held constant at roughly the same total tensile value and refining was used as the control knob to keep at target.

| Condition | | A | C | D | E |
|---|---|---|---|---|---|
| NSK | (%) | 60 | 55 | 55 | 50 |
| Eucalyptus | (%) | 40 | 40 | 45 | 45 |
| NSK refining | kWh/t | 49.9 | 6.08 | 50.3 | 6.41 |
| PAE | kg/ton | 10 | 10 | 6 | 6 |
| CMC | kg/ton | 3.1 | 3.1 | 1.875 | 1.875 |
| Cellulose Nanofilament addition | (%) | 0 | 5.0 | 0 | 5 |
| Basis weight | g/m2 | 25.9 | 26.0 | 26.0 | 27.5 |
| Total Tensile Strength Index | Nm/g | 8.36 | 9.02 | 6.63 | 6.83 |
| Tensile MD | N/m | 290 | 332 | 233 | 228 |
| Tensile CD | N/m | 162 | 166 | 127 | 136 |
| Wet Tensile CD | N/m | 45 | 52.8 | 35.1 | 42.6 |
| MD Tensile Index | Nm/g | 11.20 | 12.77 | 8.96 | 19.91 |
| CD tensile Index | Nm/g | 6.25 | 6.38 | 4.88 | 6.24 |
| Mean square Dry tensile index | Nm/g | 7.84 | 8.14 | 6.46 | 8.87 |
| Wet/Dry ratio | | 0.278 | 0.318 | 0.276 | 0.313 |

Observation: We were unsuccessful in holding the product tensile constant within a product group using only refining as the control knob within the time constraints of this experiment. Within process and test method variation, CD tensile was held constant with a range of only 162-166 N/m., but surprisingly CD wet tensile increased from 45 to 52.8 N/m and this surprisingly increased the wet to dry tensile ratio from 0.28 to 0.32. More surprising was the fact that wet tensile increased with reducing refining energy input as it is well documented that wet tensile generally increases with refining during normal refining control limits. This data was not expected from all previous information disclosed regarding cellulose filament fibers. For example, the soft wood pulp fiber can be refined at a delivery energy of less than about 25 kWh/bdt or less than about 10 kWh/bdt.

Toweling parent rolls obtained from the Valmet Karlstad TAD demonstration machine containing the cellulose nano filaments of the present disclosure were converted on the Fabio Perini pilot converting line in Green Bay Wisconsin. The converting line was set-up with the following emboss rolls:

Top D9106pe (Perini DESL (nested) Towel Pattern)

Lower D9235pe (Perini DESL (nested) Towel Pattern)

The converting line was operated with set-up rolls to establish consistent embossing and the proper glue addition to ensure proper lamination and web tensions. The rewinder was set to Towel parameters of, 86 sheet count, 9.0" sheet length, a 5-inch roll diameter and a 11-inch roll height to simulate market laminated premium towel. The trial was executed, and the converted product was tested by the Institute of Paper Science Testing Company in Appleton Wisconsin with the following results:

| Condition | | A - Base High Strength | B - Test High strength | C- Base Low Strength | D - Test Low strength |
|---|---|---|---|---|---|
| NSK | (%) | 60 | 60 | 55 | 55 |
| Eucalyptus | (%) | 40 | 40 | 45 | 40 |
| NSK refining | kWt/bdt | 49.9 | 6.08 | 50.3 | 6.41 |
| Kymene | kg/ton | 10 | 10 | 6 | 6 |
| CMC | kg/ton | 3.1 | 3.1 | 1.875 | 1.875 |
| Cellulose nanofilament addition | (%) | 0 | 5.0 | 0 | 5 |
| Basis weight | g/m2 | 52.1 | 53.6 | 53.5 | 52.2 |
| Thickness | (mils) | 26.6 | 27.2 | 26.6 | 26.6 |
| Bulk | (g/cm3) | 0.077 | 0.077 | 0.079 | 0.077 |
| Air Permeability | cm3/s/cm2 | 29.5 | 20.5 | 26.5 | 22.1 |
| Tensile MD | N/m | 547 | 610 | 417 | 453 |
| Tensile CD | N/m | 289 | 319 | 221 | 241 |
| MD Tensile Index | Nm/g | 10.50 | 11.38 | 7.79 | 8.68 |
| CD tensile Index | Nm/g | 5.55 | 5.95 | 4.13 | 4.62 |
| Mean square dry tensile index | Nm/g | 7.19 | 7.63 | 5.71 | 6.22 |
| Total Tensile Strength Index | Nm/g | 16.0 | 17.3 | 11.9 | 13.3 |
| MD Wet Tensile | N/m | 168 | 202 | 119 | 139 |
| CD Wet Tensile | N/m | 84.2 | 99.8 | 59.6 | 72.3 |
| MD Wet to Dry ratio | | 0.31 | 0.33 | 0.29 | 0.31 |
| CD Wet/Dry ratio | | 0.29 | 0.31 | 0.27 | 0.30 |

Observation: We were unsuccessful in holding the product dry tensile constant within a product group as a result of the product variation of the rolls selected for converting. Within process and test method variation, CD tensile is not constant and has a range of 289-319 N/m. for the high tensile product parameters and had a range of 221-241 N/m for the low tensile demonstration and surprisingly CD wet tensile increased from 84.2 to 99.8 N/m and 60-72.3 N/m and this surprisingly increased the CD wet to dry tensile ratio from 0.27 to 0.31. More surprising was the fact that wet tensile increased with reducing refining energy input as it is well documented that wet tensile generally increases with refining during normal refining control limits. For example, the soft wood pulp fiber can be refined at a delivered energy of less than about 25 kWh/bdt or less than about 10 kWH/bdt.

Analytical Test Methods

The following test methods are representative of the techniques utilized to determine the physical characteristics of the absorbent paper webs associated herewith.

1. Sample Conditioning and Preparation

All samples for testing are prepared in a conditioning environment generally following accepted standards for paper testing. The conditioning environment for samples have a creative humidity of approximately 50% and a temperature of approximately 74 degrees Fahrenheit.

2. Total Dry Tensile Strength

The Dry Tensile Strength characteristic of absorbent paper web sample of the present disclosure is determined by carrying out the test method published by the International Organization for Standardization, ISO 12625-4:2005, Tissue paper and tissue products—Part 4: Determination of tensile strength, stretch at break and tensile energy absorption. ISO 12625-4 is used to measure both Machine Direction (MD) and Cross-machine Direction (CD) Dry Tensile Strengths. The Total Dry Tensile Strength is the mathematical sum of the Machine Direction Dry Tensile Strength and the Cross-machine Direction Dry Tensile Strength.

3. Mean Square Dry Tensile Strength Index

Mean Square Dry Tensile Strength index is a calculated parameter derived from ISO 12625-4 results and is equivalent to the square root of the MD tensile index squared plus the CD tensile index squared. Mean Square Dry Tensile Strength Index may provide a more representative metric to evaluate overall sheet strength per unit mass.

4. Total Tensile Strength Index

Total Tensile Strength index is a calculated parameter derived from ISO 12625-4 results and is equivalent to the arithmetic sum of the MD tensile plus the CD tensile divided by the basis weight. Total tensile index may provide a more representative metric to evaluate overall sheet strength per unit mass.

5. Wet Tensile Strength

The Wet Tensile Strength characteristic of absorbent paper web sample of the present disclosure is determined by carrying out the test method published by the International Organization for Standardization, ISO 12625-5:2005, Tissue paper and tissue products—Part 5: Determination of wet tensile strength. ISO 12625-5 is used to measure both Machine Direction (MD) and Cross-machine Direction (CD) Wet Tensile Strengths.

6. CD Wet Tensile: CD Dry Tensile Ratio

The characteristic ratio of Cross-machine Direction Wet Tensile Strength to Cross-machine Direction Dry Tensile Strength is calculated as the mathematic ratio of the two characteristic parameters.

$$\text{Ratio} = \frac{CD \text{ Wet Tensile Strength}}{CD \text{ Dry Tensile Strength}}$$

When employed in the present disclosure, the terms “comprises”, “comprising”, and other derivatives from the root term “comprise” are intended to be open-ended terms that specify the presence of any stated features, elements, integers, steps, or components, and are not intended to preclude the presence or addition of one or more other features, elements, integers, steps, components, or groups thereof.

The dimensions and values disclosed herein are not to be understood as being strictly limited to the exact dimension and values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present disclosure have been illustrated and described, it would be obvious to those skilled in the art that various other changes and modifications can be made without departing from the spirit and scope of the disclosure, which is intended to be limited only by the scope of the appended claims as interpreted according to the principles of patent law including the doctrine of equivalents.

The embodiments of the invention in which an exclusive property or privilege is claimed are defined as follows:

1. An absorbent paper web comprising:

(a) from about 20% to about 90% by weight of the dry fiber basis of the paper web of a refined soft wood pulp fiber mixture, the refined soft wood pulp fiber mixture comprising:
   i) from about 18.5% to about 88.5% by weight of the dry fiber basis of the paper web of long fiber soft wood pulp fiber, wherein the long fiber soft wood pulp fiber is refined at a delivered energy of less than 50.3 kWh/t before being added to the refined soft wood pulp fiber mixture;
   ii) from about 0.25% to about 5.0% by weight of the dry fiber basis of the paper web of cationic strengthening polymer; and
   iii) from about 0.05% to about 20% by weight of the dry fiber basis of the paper web of cellulose nanofilaments;

(b) pulp fibers selected from the group consisting of hard wood fibers, non-wood fibers, recycled fibers, synthetic polymer fibers, bleached eucalyptus kraft fibers, and combinations thereof; and (c) not more than about 10% by weight moisture;

wherein the paper web has a Total Tensile Strength index ranging from about 6 N·m/g to about 12 N·m/g, and wherein the paper web has a Cross-directional Wet Tensile Strength to Cross-directional Dry Tensile Strength Ratio value ranging from about 0.295 to about 0.35.

2. The absorbent paper web of claim 1, wherein the paper web is produced by a paper making process that introduces differential density within the fibrous web.

3. The absorbent paper web of claim 1, wherein the paper web is produced via a process selected from the group consisting of a through-air dried paper-making process, a New Tissue Technology (NTT) paper-making process, an Advanced Tissue Molding System (ATMOS) paper-making process, an Uncreped Through Air Dried (UCTAD) paper-making process, and an Air-laid forming paper-making process.

4. An absorbent paper web comprising:

(a) from about 20% to about 90% by weight of a dry fiber basis of the paper web of a refined soft wood pulp fiber mixture, the refined soft wood pulp fiber mixture comprising:
   i) from about 18.5% to about 88.5% by weight of the dry fiber basis of the paper web of soft wood pulp fiber, wherein the soft wood pulp fiber is refined at a delivered energy of less than 50.3 kWh/t before being added to the refined soft wood pulp fiber mixture;
   ii) from about 0.25% to about 5.0% by weight of the dry fiber basis of the paper web of cationic strengthening polymer; and
   iii) from about 0.05% to about 20% by weight of the dry fiber basis of the paper web of cellulose nanofilaments;

(b) a pulp fiber selected from the group consisting of hard wood fibers, non-wood fibers, recycled fibers, synthetic polymer fibers, bleached eucalyptus kraft fibers, and combinations thereof; and (c) not more than about 10% by weight moisture;

wherein the paper web has a Mean Square Dry Tensile Strength Index ranging from about 5 Nm/g to about 10 Nm/g; and wherein the paper web has a Cross-directional Wet Tensile Strength to Cross-directional Dry Tensile Strength Ratio value ranging from about 0.295 to about 0.35.

5. The absorbent paper web of claim 4, wherein the paper web is produced by a paper making process that introduces differential density within the fibrous web.

6. The absorbent paper web of claim 4, wherein the paper web is produced via a process selected from the group consisting of a through-air dried paper-making process, a New Tissue Technology (NTT) paper-making process, an Advanced Tissue Molding System (ATMOS) paper-making process, an Uncreped Through Air Dried (UCTAD) paper-making process, and an Air-laid forming paper-making process.

7. An absorbent paper web comprising:

(a) from about 20% to about 90% by weight of a dry fiber basis of the paper web of a refined soft wood pulp fiber mixture, the refined soft wood pulp fiber mixture comprising:
   i) from about 18.5% to about 88.5% by weight of the dry fiber basis of the paper web of long fiber soft wood pulp fiber, wherein the long fiber soft wood pulp fiber is refined at a delivered energy of less than 50.3 kWh/t refined before being added to the refined soft wood pulp fiber mixture;
   ii) from about 0.25% to about 5.0% by weight of the dry fiber basis of the paper web of cationic strengthening polymer; and
   iii) from about 0.05% to about 20% by weight of the dry fiber basis of the paper web of cellulose nanofilaments;

(b) a pulp fiber selected from the group consisting of hard wood fibers, non-wood fibers, recycled fibers, synthetic polymer fibers, bleached eucalyptus kraft fibers, and combinations thereof; and (c) not more than about 10% by weight moisture;

wherein the paper web has a Total Tensile Strength Index ranging from about 6 N·m/g to about 12 N·m/g, and wherein the paper web has a Cross-directional Wet Tensile Strength to Cross-directional Dry Tensile Strength Ratio value ranging from about 0.20 to about 0.50.

8. The absorbent paper web of claim 7, wherein the paper web is produced by a paper making process that introduces differential density within the fibrous web.

9. The absorbent paper web of claim 7, wherein the paper web is produced via a process selected from the group consisting of a through-air dried paper-making process, a New Tissue Technology (NTT) paper-making process, an Advanced Tissue Molding System (ATMOS) paper-making process, an Uncreped Through Air Dried (UCTAD) paper-making process, and an Air-laid forming paper-making process.

* * * * *